(12) United States Patent
Won

(10) Patent No.: US 12,082,286 B2
(45) Date of Patent: Sep. 3, 2024

(54) APPARATUS, METHOD, AND COMPUTER PROGRAM FOR CONNECTION MANAGEMENT

(71) Applicant: NOKIA TECHNOLOGIES OY, Espoo (FI)

(72) Inventor: Sung Hwan Won, Seoul (KR)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/291,153

(22) PCT Filed: Nov. 14, 2018

(86) PCT No.: PCT/EP2018/081140
§ 371 (c)(1),
(2) Date: May 4, 2021

(87) PCT Pub. No.: WO2020/098926
PCT Pub. Date: May 22, 2020

(65) Prior Publication Data
US 2022/0078871 A1    Mar. 10, 2022

(51) Int. Cl.
*H04W 76/27*    (2018.01)
*H04W 76/19*    (2018.01)

(52) U.S. Cl.
CPC .......... *H04W 76/19* (2018.02); *H04W 76/27* (2018.02)

(58) Field of Classification Search
CPC .............................. H04W 76/19; H04W 76/27
See application file for complete search history.

(56) References Cited

U.S. PATENT DOCUMENTS

| 8,743,752 | B2* | 6/2014 | Zhou ............... H04W 76/10 370/328 |
| 9,544,709 | B2 | 1/2017 | Jain et al. |
| 10,111,140 | B2 | 10/2018 | Burbidge et al. |
| 2010/0182971 | A1 | 7/2010 | Chin |
| 2012/0281566 | A1 | 11/2012 | Pelletier et al. |

(Continued)

FOREIGN PATENT DOCUMENTS

| CN | 102356691 A | 2/2012 |
| CN | 105794300 A | 7/2016 |

(Continued)

OTHER PUBLICATIONS

3GPP TS 24.501 Version 15.1.0 (Sep. 21, 2018). 3rd Generation Partnership Project; Technical Specification Group Core Network and Terminals; Non-Access-Stratum (NAS) protocol for 5G System; Stage 3, Release 15. 2018.*

(Continued)

*Primary Examiner* — Yuwen Pan
*Assistant Examiner* — Swati Jain
(74) *Attorney, Agent, or Firm* — ALSTON & BIRD LLP

(57) ABSTRACT

An apparatus comprising: at least one processor: and at least one memory including computer program code: the at least one memory and the computer program code configured to, with the at least one processor, cause the apparatus at least to: receive (602) a fallback indication from a radio resource control layer: invoke (604) a service request procedure: and set (606, 608) at least one of a service type information element and an uplink data status information element in a service request message.

30 Claims, 16 Drawing Sheets

---

702 Determining that that the UE has pending UL user data and no pending NAS procedure

↓

704 Setting the UL data status IE in the SERVICE REQUEST message to indicate PDU sessions for which user-plane resources were active prior to receiving a fallback indication

(56) References Cited

U.S. PATENT DOCUMENTS

| | | | |
|---|---|---|---|
| 2016/0227468 A1 | 8/2016 | Kim et al. | |
| 2017/0290083 A1* | 10/2017 | Tiwari | H04W 76/25 |
| 2017/0332431 A1 | 11/2017 | Kim et al. | |
| 2017/0374613 A1* | 12/2017 | Ianev | H04W 40/04 |
| 2018/0376444 A1* | 12/2018 | Kim | H04W 36/0022 |
| 2019/0053034 A1* | 2/2019 | Kim | H04W 76/20 |
| 2019/0246318 A1* | 8/2019 | Kim | H04W 4/70 |
| 2020/0280948 A1* | 9/2020 | Youn | H04W 68/02 |
| 2020/0304985 A1* | 9/2020 | Gupta | G06F 21/35 |
| 2021/0084528 A1* | 3/2021 | Kim | H04W 28/0242 |
| 2021/0136659 A1* | 5/2021 | Ianev | H04W 28/02 |
| 2021/0274586 A1* | 9/2021 | Pelletier | H04W 76/27 |
| 2021/0345434 A1* | 11/2021 | Wu | H04W 76/19 |
| 2022/0303756 A1* | 9/2022 | Gupta | H04W 8/20 |
| 2023/0164730 A1* | 5/2023 | Kumar | H04W 76/12 370/352 |
| 2023/0224990 A1* | 7/2023 | Ramle | H04W 76/15 370/329 |

FOREIGN PATENT DOCUMENTS

| | | |
|---|---|---|
| JP | 2019/531651 A | 10/2019 |
| RU | 2659405 C2 | 6/2018 |
| TW | I542242 B | 7/2016 |
| WO | WO 2015/184865 A1 | 12/2015 |
| WO | WO 2017/142363 A1 | 8/2017 |

OTHER PUBLICATIONS

3GPP TS 24.501 Version 15.1.0 (Sep. 21, 2018). 3rd Generation Partnership Project; Technical Specification Group Core Network and Terminals; Non-Access-Stratum (NAS) protocol for 5G System; Stage 3, Release 15. 2018 (Year: 2018).*
Huawei et al: "Clarifications on UE behavior upon receiving RRC fallback indication", 3GPP Draft; vol. CT WGl, Oct. 8, 2018 (Year: 2018).*
"3rd Generation Partnership Project; Technical Specification Group Core Network and Terminals; Non-Access-Stratum (NAS) protocol for 5G System (5GS); Stage 3 (Release 15)", 3GPP TS 24.501 v15.1.0, (Sep. 2018), 398 pages.
Huawei et al., "Clarifications on UE Behaviour Upon Receiving RRC Fallback Indication", 3GPP TSG-CT WG1 Meeting #112bis, C1-186498, (Oct. 15-19, 2018), 8 pages.
International Search Report and Written Opinion for Patent Cooperation Treaty Application No. PCT/EP2018/081140 dated Sep. 4, 2019, 11 pages.
Office Action for Algerian Application No. DZ/P/2021/000307 dated Apr. 14, 2022, 2 pages.
Office Action for European Application No. 18803651.1 dated May 2, 2022, 6 pages.
Decision to Grant for Japanese Application No. 2021-524260 dated Jul. 4, 2022, 5 pages.
Huawei et al., "Clarifications on UE Behaviour Upon Receiving RRC Fallback Indication", 3GPP TSG-CT WG1 Meeting #112bis, Change Request 0532, C1-186498, (Oct. 15-19, 2018), 8 pages.
Nokia et al., "Setting the Uplink Data Status and Service Type IEs After Receiving a Fallback Indication from the Lower Layers", 3GPP TSG-CT WG1 Meeting #113, Change Request 0665, C1-188382, (Nov. 26-30, 2018), 15 pages.
Notice of Allowance for Taiwanese Application No. 108141254 dated Jun. 9, 2022, 3 pages.
Office Action for Canadian Application No. 3,118,784 dated Jun. 22, 2022, 4 pages.
Office Action for Chilean Application No. 202101144 dated Jun. 3, 2022, 9 pages.
Office Action for Korean Application No. 10-2021-7011423 dated Jun. 16, 2022, 11 pages.
Examination Report for Australian Application No. 2018449171 dated Nov. 30, 2021, 2 pages.
Notice of Acceptance for Australian Application No. 2018449171 dated Jan. 19, 2022, 3 pages.
Office Action for Bangladesh Application No. 353/2019 dated Jan. 1, 2021, 1 page.
Notice of Acceptance for Bangladesh Application No. 353/2019 dated Aug. 24, 2021, 1 page.
Office Action for Russian Application No. 2021110811/07 dated Jan. 12, 2022, 7 pages.
Office Action for Taiwanese Application No. 108141254 dated Nov. 2, 2020, 6 pages.
First Examination Report for Indian Application No. 202127025630 dated Dec. 8, 2022, 6 pages.
Office Action for ARIPO Application No. AP/P/2021/013034 dated Nov. 7, 2022, 5 pages.
Decision to Grant for Russian Application No. 2021110811/07 dated May 30, 2022, 13 pages.
Huawei et al., "Uplink data handling for idle mode over non-3GPP access", 3GPP TSG-CT WG1 Meeting #112bis, Change Request CR 0469, C1-186385, (Oct. 15-19, 2018), 7 pages.
Nokia et al., "Clarification on setting a service type of a Service Request message", 3GPP TSG-CT WG1 Meeting #112bis, Change Request CR 0545, C1-187011, (Oct. 15-19, 2018), 4 pages.
Nokia et al., "T3517 handling and emergency services fallback", 3GPP TSG-CT WG1 Meeting #112bis, Change Request CR 0537, C1-186630, (Oct. 15-19, 2018), 9 pages.
Notice of Allowance for Canadian Application No. 3,118,784 dated Apr. 17, 2023, 1 page.
Notice of Allowance for Chilean Application No. 2021-001144 dated Jan. 26, 2023, 2 pages.
Notice of Allowance for Indonesian Application No. P00202104396 dated Nov. 2, 2023, 4 pages.
Notice of Allowance for Korean Application No. 10-2021-7011423 dated Jan. 23, 2024, 3 pages.
Notice of Allowance for Korean Application No. 10-2021-7011423 dated Oct. 13, 2023, 3 pages.
Notice of Allowance for Taiwanese Application No. 111134350 dated Oct. 30, 2023, 3 pages.
Notice of Eligibility of Grant for Singapore Application No. 11202103094W dated Apr. 20, 2023, 6 pages.
Office Action for Australian Application No. 2022202970 dated Jun. 7, 2023, 2 pages.
Office Action for Chilean Application No. 202101144 dated Sep. 13, 2022, 22 pages.
Office Action for Chinese Application No. 201880098853.X dated Mar. 8, 2024, 15 pages.
Office Action for Chinese Application No. 201880098853.X dated Oct. 11, 2023, 14 pages.
Office Action for Egyptian Application No. 686/2021 dated Jan. 3, 2024, 5 pages.
Office Action for Egyptian Application No. 686/2021 dated Jun. 12, 2023, 5 pages.
Office Action for Indonesian Application No. P00202104396 dated May 10, 2023, 6 pages.
Office Action for Korean Application No. 10-2021-7011423 dated Apr. 3, 2023, 6 pages.
Office Action for Saudi Arabian Application No. 521421947 dated Jun. 15, 2023, 8 pages.
Office Action for Taiwanese Application No. 111134350 dated May 30, 2023, 6 pages.
Office Action for Vietnamese Application No. 1-2021-03056 dated Dec. 28, 2023, 3 pages.
Qualcomm Incorporated, "Updates to RRC fallback indication while in 5GMM-Connected mode, or while in 5GMM-CONNECTED mode with RRC inactive indication", 3GPP TSG-CT WG1 Meeting #112, Change Request CR 0280, C1-185836, (Aug. 20-24, 2018), 15 pages.
Samsung R&D Institute UK et al., "Requests for emergency services fallback from upper layers", 3GPP TSG-CT WG1 Meeting #112, Change Request CR 0242, C1-185052, (Aug. 20-24, 2018), 10 pages.

(56) References Cited

OTHER PUBLICATIONS

Samsung R&D Institute UK et al., "Requests for emergency services fallback from upper layers", 3GPP TSG-CT WG1 Meeting #112, Change Request CR 0242, C1-185670, (Aug. 20-24, 2018), 7 pages.
Notice of Acceptance for Australian Application No. 2022202970 dated May 21, 2024, 3 pages.
Notice of Allowance for Vietnamese Application No. 10-2021-03056 dated Jun. 25, 2024, 2 pages.
Office Action for Korean Application No. 10-2024-7013245 dated May 28, 2024, 6 pages.
Office Action for Mexican Application No. MX/a/2021/005412 dated May 16, 2024, 5 pages.

\* cited by examiner

902 Determining that the UE has a pending service request procedure invoked due to another than ESFB

904 Setting the UL data data status IE in the SERVICE REQUEST message to indicate PDU sessions for which user-plane resources were active prior to receiving a fallback indication from an RRC layer entity and/or PDU sessions for which user-plane resources were not active prior to receiving the fallback indication and the UE has pending user data to be sent over 3GPP access

Fig. 9

APPARATUS, METHOD, AND COMPUTER PROGRAM FOR CONNECTION MANAGEMENT

CROSS-REFERENCE TO RELATED APPLICATIONS

This non-provisional patent application is a National Phase Entry under 35 U.S.C. § 371 of International Patent Application No. PCT/EP2018/081140 filed on Nov. 14, 2018 and entitled "Apparatus, Method and Computer Program for Connection Management," which is incorporated by reference in its entirety as if fully provided herein.

FIELD OF THE DISCLOSURE

The present disclosure relates to an apparatus, a method, and a computer program for invoking a service request procedure.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) of the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: receive a fallback indication from a radio resource control layer; invoke a service request procedure; and set at least one of a service type information element and an uplink data status information element in a service request message.

The at least one memory and the computer program code may be configured to, with the at least one processor, cause the apparatus at least to: determine that (i) the user equipment has no pending non-access stratum procedure, (j) the user equipment has a pending service request procedure due to a reason different than a predetermined reason, (k) the user equipment has a pending service request procedure due to the predetermined reason, or (l) the user equipment has a pending non-access stratum procedure other than a service request procedure; and invoke the service request procedure based on the determining.

The at least one memory and the computer program code may be configured to, with the at least one processor, cause the apparatus at least to: determine that (i) the user equipment has pending uplink user data and no pending non-access stratum procedure.

The at least one memory and the computer program code may be configured to, with the at least one processor, cause the apparatus at least to: determine that (j) the user equipment has a pending service request procedure invoked due to other than an emergency service fallback.

The at least one memory and the computer program code may be configured to, with the at least one processor, cause the apparatus at least to: determine that (k) the user equipment has a pending service request procedure invoked due to an emergency service fallback.

The at least one memory and the computer program code may be configured to, with the at least one processor, cause the apparatus at least to: determine that (l) the user equipment has a pending non-access stratum procedure other than a registration procedure, a service request procedure or a deregistration procedure.

The user equipment nay be in a connected mode.

The user equipment may be in a connected inactive mode.

The at least one memory and the computer program code may be configured to, with the at least one processor, cause the apparatus at least to: set the service type information element in the service request message dependent on the determining.

The at least one memory and the computer program code may be configured to, with the at least one processor, cause the apparatus at least to: set the service type information element in the service request message to 'high priority access', 'emergency services', or 'data' when (i) the user equipment has no pending non-access stratum procedure.

The at least one memory and the computer program code may be configured to, with the at least one processor, cause the apparatus at least to: set the service type information element in the service request message to 'mobile terminated services', 'high priority access', 'emergency services', or 'data' when (j) the user equipment has a pending service request procedure due to a reason different than the predetermined reason.

The at least one memory and the computer program code may be configured to, with the at least one processor, cause the apparatus at least to: set the service type information element in the service request message to 'emergency services fallback' when (k) the user equipment has a pending service request procedure due to a predetermined reason.

The at least one memory and the computer program code may be configured to, with the at least one processor, cause the apparatus at least to: set the service type information element in the service request message to 'high priority access', 'emergency services', or 'signalling' when (l) the user equipment has a pending non-access stratum procedure other than a service request procedure.

The at least one memory and the computer program code may configured to, with the at least one processor, cause the apparatus at least to: set the uplink data status information element in the service request message based on the determining.

The at least one memory and the computer program code may be configured to, with the at least one processor, cause the apparatus at least to: set the uplink data status information element in the service request message to indicate packet data unit sessions for which user-plane resources were active prior to invoking the service request procedure when (i) the user equipment has no pending non-access stratum procedure.

The at least one memory and the computer program code may be configured to, with the at least one processor, cause the apparatus at least to: set the uplink data status information element in the service request message to indicate packet data unit sessions for which user-plane resources were active prior to invoking the service request procedure and/or packet data unit sessions for which user-plane resources were not active prior to receiving the fallback indication and the user equipment has pending user data to be sent over a cellular network when (j) the user equipment has a pending service request procedure due to a reason different than the predetermined reason.

The at least one memory and the computer program code may be configured to, with the at least one processor, cause the apparatus at least to: set the uplink data status information element in the service request message to indicate packet data unit sessions for which user-plane resources were active prior to invoking the service request procedure, when (l) the user equipment in connected mode has a pending non-access stratum procedure other than a service request procedure.

The at least one memory and the computer program code may be configured to, with the at least one processor, cause the apparatus at least to: set the uplink data status information element in the service request message to indicate always-on packet data unit sessions, when (l) the user equipment in connected inactive mode has a pending non-access stratum procedure other than a service request procedure.

The at least one of the receiving, the determining, the invoking and the setting may be performed at a non-access stratum layer.

According to an aspect there is provided an apparatus comprising circuitry configured to: receive a fallback indication from a radio resource control layer; invoke a service request procedure; and set at least one of a service type information element and an uplink data status information element in a service request message.

The circuitry may be configured to: determine that (i) the user equipment has no pending non-access stratum procedure, (j) the user equipment has a pending service request procedure due to a reason different than a predetermined reason, (k) the user equipment has a pending service request procedure due to the predetermined reason, or (l) the user equipment has a pending non-access stratum procedure other than a service request procedure; and invoke the service request procedure based on the determining.

The circuitry may be configured to: determine that (i) the user equipment has pending uplink user data and no pending non-access stratum procedure.

The circuitry may be configured to: determine that (j) the user equipment has a pending service request procedure invoked due to other than an emergency service fallback.

The circuitry may be configured to: determine that (k) the user equipment has a pending service request procedure invoked due to an emergency service fallback.

The circuitry may be configured to: determine that (l) the user equipment has a pending non-access stratum procedure other than a registration procedure, a service request procedure, or a deregistration procedure.

The user equipment nay be in a connected mode.

The user equipment may be in a connected inactive mode.

The circuitry may be configured to: set the service type information element in the service request message dependent on the determining.

The circuitry may be configured to: set the service type information element in the service request message to 'high priority access', 'emergency services', or 'data' when (i) the user equipment has no pending non-access stratum procedure.

The circuitry may be configured to: set the service type information element in the service request message to 'mobile terminated services', 'high priority access', 'emergency services', or 'data' when (j) the user equipment has a pending service request procedure due to a reason different than the predetermined reason.

The circuitry may be configured to: set the service type information element in the service request message to 'emergency services fallback' when (k) the user equipment has a pending service request procedure due to a predetermined reason.

The circuitry may be configured to: set the service type information element in the service request message to 'high priority access', 'emergency services', or 'signalling' when (1) the user equipment has a pending non-access stratum procedure other than a service request procedure.

The circuitry may be configured to: set the uplink data status information element in the service request message based on the determining.

The circuitry may be configured to: set the uplink data status information element in the service request message to indicate packet data unit sessions for which user-plane resources were active prior to invoking the service request procedure when (i) the user equipment has no pending non-access stratum procedure.

The circuitry may be configured to: set the uplink data status information element in the service request message to indicate packet data unit sessions for which user-plane resources were active prior to invoking the service request procedure and/or packet data unit sessions for which user-plane resources were not active prior to receiving the fallback indication and the user equipment has pending user data to be sent over a cellular network when (j) the user equipment has a pending service request procedure due to a reason different than the predetermined reason.

The circuitry may be configured to: set the uplink data status information element in the service request message to indicate packet data unit sessions for which user-plane resources were active prior to invoking the service request procedure, when (1) the user equipment in connected mode has a pending non-access stratum procedure other than a service request procedure.

The circuitry may be configured to: set the uplink data status information element in the service request message to indicate always-on packet data unit sessions, when (1) the user equipment in connected inactive mode has a pending non-access stratum procedure other than a service request procedure.

The at least one of the receiving, the determining, the invoking and the setting may be performed at a non-access stratum layer.

According to an aspect there is provided a method comprising: receiving a fallback indication from a radio resource control layer; invoking a service request procedure; and setting at least one of a service type information element and an uplink data status information element in a service request message.

The method may comprise: determining that (i) the user equipment has no pending non-access stratum procedure, (j) the user equipment has a pending service request procedure due to a reason different than a predetermined reason, (k) the user equipment has a pending service request procedure due to the predetermined reason, or (l) the user equipment has a pending non-access stratum procedure other than a service request procedure; and invoke the service request procedure based on the determining.

The method may comprise: determining that (i) the user equipment has pending uplink user data and no pending non-access stratum procedure.

The method may comprise: determining that (j) the user equipment has a pending service request procedure invoked due to other than an emergency service fallback.

The method may comprise: determining that (k) the user equipment has a pending service request procedure invoked due to an emergency service fallback.

The method may comprise: determining that (l) the user equipment has a pending non-access stratum procedure other than a registration procedure, a service request procedure or a deregistration procedure.

The user equipment nay be in a connected mode.

The user equipment may be in a connected inactive mode.

The method may comprise: setting the service type information element in the service request message dependent on the determining.

The method may comprise: setting the service type information element in the service request message to 'high priority access', 'emergency services', or 'data' when (i) the user equipment has no pending non-access stratum procedure.

The method may comprise: setting the service type information element in the service request message to 'mobile terminated services', 'high priority access', 'emergency services', or 'data' when (j) the user equipment has a pending service request procedure due to a reason different than the predetermined reason.

The method may comprise: setting the service type information element in the service request message to 'emergency services fallback' when (k) the user equipment has a pending service request procedure due to a predetermined reason.

The method may comprise: setting the service type information element in the service request message to 'high priority access', 'emergency services', or 'signalling' when (l) the user equipment has a pending non-access stratum procedure other than a service request procedure.

The method may comprise: setting the uplink data status information element in the service request message based on the determining.

The method may comprise: setting the uplink data status information element in the service request message to indicate packet data unit sessions for which user-plane resources were active prior to invoking the service request procedure when (i) the user equipment has no pending non-access stratum procedure.

The method may comprise: setting the uplink data status information element in the service request message to indicate packet data unit sessions for which user-plane resources were active prior to invoking the service request procedure and/or packet data unit sessions for which user-plane resources were not active prior to receiving the fallback indication and the user equipment has pending user data to be sent over a cellular network when (j) the user equipment has a pending service request procedure due to a reason different than the predetermined reason.

The method may comprise: setting the uplink data status information element in the service request message to indicate packet data unit sessions for which user-plane resources were active prior to invoking the service request procedure, when (l) the user equipment in connected mode has a pending non-access stratum procedure other than a service request procedure.

The method may comprise: setting the uplink data status information element in the service request message to indicate always-on packet data unit sessions, when (l) the user equipment in connected inactive mode has a pending non-access stratum procedure other than a service request procedure.

The at least one of the receiving, the determining, the invoking and the setting may be performed at a non-access stratum layer.

According to an aspect there is provided a computer program comprising computer executable code which when run on at least one processor is configured to receive a fallback indication from a radio resource control layer; invoke a service request procedure; and set at least one of a service type information element and an uplink data status information element in a service request message.

The computer program comprising computer executable code which when run on at least one processor may be configured to: determine that (i) the user equipment has no pending non-access stratum procedure, (j) the user equipment has a pending service request procedure due to a reason different than a predetermined reason, (k) the user equipment has a pending service request procedure due to the predetermined reason, or (l) the user equipment has a pending non-access stratum procedure other than a service request procedure; and invoke the service request procedure based on the determining.

The computer program comprising computer executable code which when run on at least one processor may be configured to: determine that (i) the user equipment has pending uplink user data and no pending non-access stratum procedure.

The computer program comprising computer executable code which when run on at least one processor may be configured to: determine that (j) the user equipment has a pending service request procedure invoked due to other than an emergency service fallback.

The computer program comprising computer executable code which when run on at least one processor may be configured to: determine that (k) the user equipment has a pending service request procedure invoked due to an emergency service fallback.

The computer program comprising computer executable code which when run on at least one processor may be configured to: determine that (l) the user equipment has a pending non-access stratum procedure other than a registration procedure, a service request procedure, or a deregistration procedure.

The user equipment nay be in a connected mode.

The user equipment may be in a connected inactive mode.

The computer program comprising computer executable code which when run on at least one processor may be configured to: set the service type information element in the service request message dependent on the determining.

The computer program comprising computer executable code which when run on at least one processor may be configured to: set the service type information element in the service request message to 'high priority access', 'emergency services', or 'data' when (i) the user equipment has no pending non-access stratum procedure.

The computer program comprising computer executable code which when run on at least one processor may be configured to: set the service type information element in the service request message to 'mobile terminated services', 'high priority access', 'emergency services', or 'data' when (j) the user equipment has a pending service request procedure due to a reason different than the predetermined reason.

The computer program comprising computer executable code which when run on at least one processor may be configured to: set the service type information element in the service request message to 'emergency services fallback' when (k) the user equipment has a pending service request procedure due to a predetermined reason.

The computer program comprising computer executable code which when run on at least one processor may be configured to: set the service type information element in the service request message to 'high priority access', 'emergency services', or 'signalling' when (l) the user equipment has a pending non-access stratum procedure other than a service request procedure.

The computer program comprising computer executable code which when run on at least one processor may be configured to: set the uplink data status information element in the service request message based on the determining.

The computer program comprising computer executable code which when run on at least one processor may be configured to: set the uplink data status information element in the service request message to indicate packet data unit sessions for which user-plane resources were active prior to invoking the service request procedure when (i) the user equipment has no pending non-access stratum procedure.

The computer program comprising computer executable code which when run on at least one processor may be configured to: set the uplink data status information element in the service request message to indicate packet data unit sessions for which user-plane resources were active prior to invoking the service request procedure and/or packet data unit sessions for which user-plane resources were not active prior to receiving the fallback indication and the user equipment has pending user data to be sent over a cellular network when (j) the user equipment has a pending service request procedure due to a reason different than the predetermined reason.

The computer program comprising computer executable code which when run on at least one processor may be configured to: set the uplink data status information element in the service request message to indicate packet data unit sessions for which user-plane resources were active prior to invoking the service request procedure, when (l) the user equipment in connected mode has a pending non-access stratum procedure other than a service request procedure.

The computer program comprising computer executable code which when run on at least one processor may be configured to: set the uplink data status information element in the service request message to indicate always-on packet data unit sessions, when (l) the user equipment in connected inactive mode has a pending non-access stratum procedure other than a service request procedure.

The at least one of the receiving, the determining, the invoking, and/or the setting may be performed at a non-access stratum layer.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AS: Access Stratum
AMF: Access Management Function
CN: Core Network
DNN: Data Network Name
DRX: Discontinuous Reception
EMM: EPS Mobility Management
ENB: Evolved Node B
EPS: Evolved Packet System
EPC: Evolved Packet core
ESFB: Emergency Service Fallback
E-UTRA: Evolved Universal Terrestrial Radio Access
GNB: next Generation Node B
GSM: Global System for Mobile communication
GUTI: Globally Unique Temporary UE Identity
HO: Handover
ID: Identifier
IE: Information Element
LTE: Long Term Evolution
LADN: Local Area Data Network
NB: Node B
NG: Next Generation
MAC: Medium Access Control
MICO: Mobile Initiated Connection Only
MS: Mobile Station
MTC: Machine Type Communication
NAS: Non-Access Stratum
NSSAI: Network Slice Selection Assistance Information
PDA: Personal Digital Assistant
PDCP: Packet Data Convergence Protocol
PDU: Packet Data Unit
PDN: Packet Data Network
PHY: Physical
PLMN: Public Land Mobile Network
RAM: Random Access Memory
RAN: Radio Access Network
RAT: Radio Access Technology
RCU: Radio Control Unit RLC: Radio Link Control
ROM: Read Only Memory
RRC: Radio Resource Control
SMS: Short Message Service
SMF: Session Management Function
S-NSSAI: Single Network Slice Selection Assistance Information
TAI: Tracking Area Identity
TMSI: Temporary Mobile Subscriber Identity
UE User Equipment
UL: Uplink
UMTS: Universal Mobile Telecommunication System
UPSI: User equipment Policy Section Identifier
USB: Universal Serial Bus
3G: 3rd Generation
3GPP: 3rd Generation Partnership Project
4G: 4th Generation
5G: 5th Generation
5GS: 5G System
5GMM: 5G system Mobility Management

BRIEF DESCRIPTION OF THE DRAWINGS

Embodiments will now be described, by way of example only, with reference to the accompanying Figures in which:

FIG. 9 shows a schematic representation of a diagram of a method of setting an uplink data status information element in a SERVICE REQUEST message when a case j) is fulfilled;

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained, with reference to FIGS. 1 to 5, to assist in understanding the technology underlying the described examples.

Figure 1:
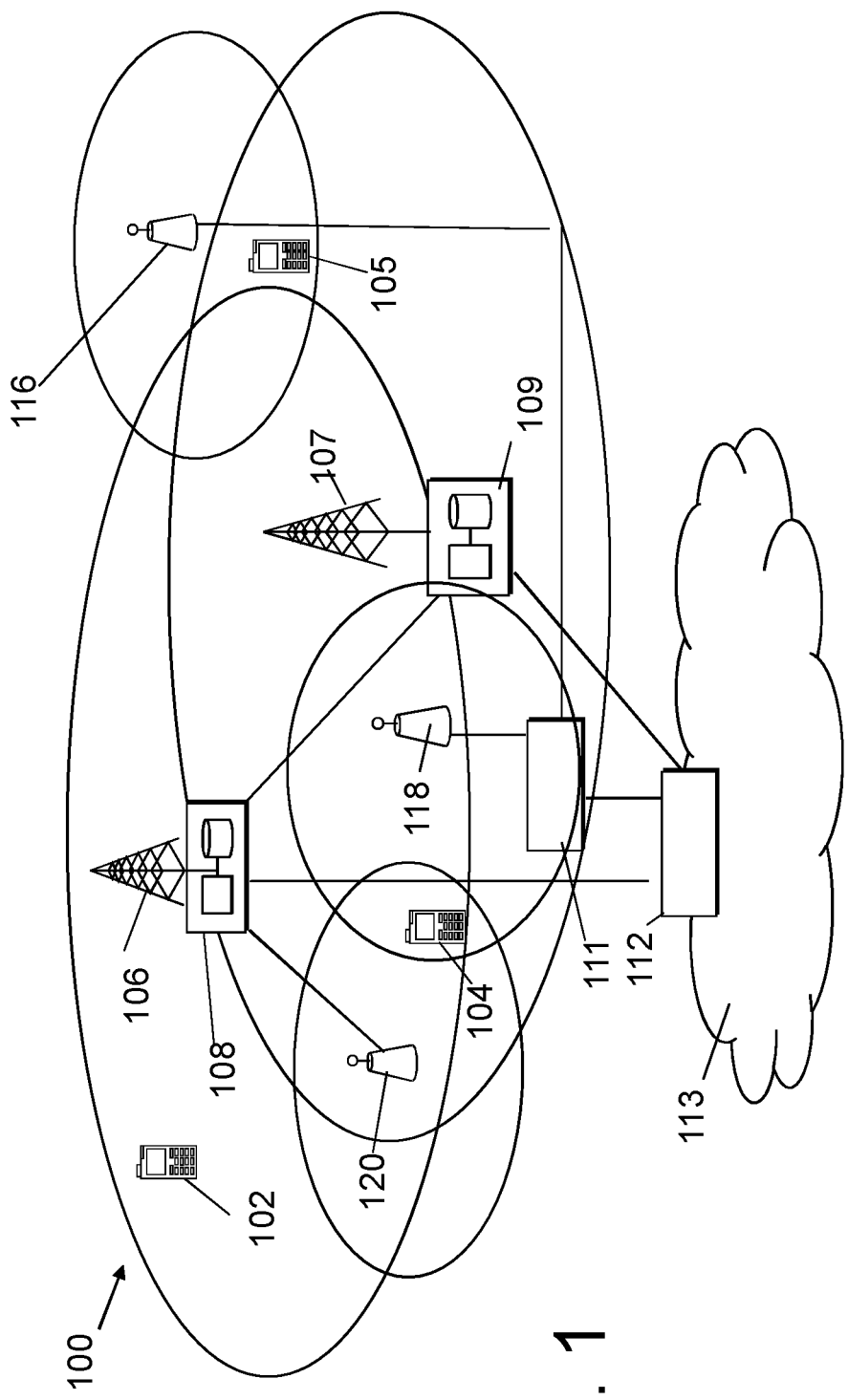
FIG. 1 shows a schematic representation of a communication system.

FIG. 1 illustrates an example of a wireless communication system 100. The wireless communication system 100 comprises wireless communication devices 102, 104, 105. The wireless communication devices 102, 104, 105 are provided wireless access via at least one base station 106 and 107 or similar wireless transmitting and/or receiving node or point. The Base stations may be evolved node Bs (eNB), next generation node Bs (gNBs) or other. Base stations 106 and 107 are typically controlled by at least one appropriate control apparatus. The controller apparatus may be part of the base stations 106 and 107.

Base stations 106 and 107 are connected to a wider communications network 113 via gateway 112. A further gateway function may be provided to connect to another network.

Base stations 116, 118, and 120 associated with smaller cells may also be connected to the network 113, for example by a separate gateway function and/or via the macro level stations. The base stations 116, 118, and 120 may be pico or femto level base stations or the like. In the example, base stations 116 and 118 are connected via a gateway 111 while base station 120 connects via the base station 106. In some embodiments, the smaller base stations 116, 118, and 120 may not be provided.

Figure 2:
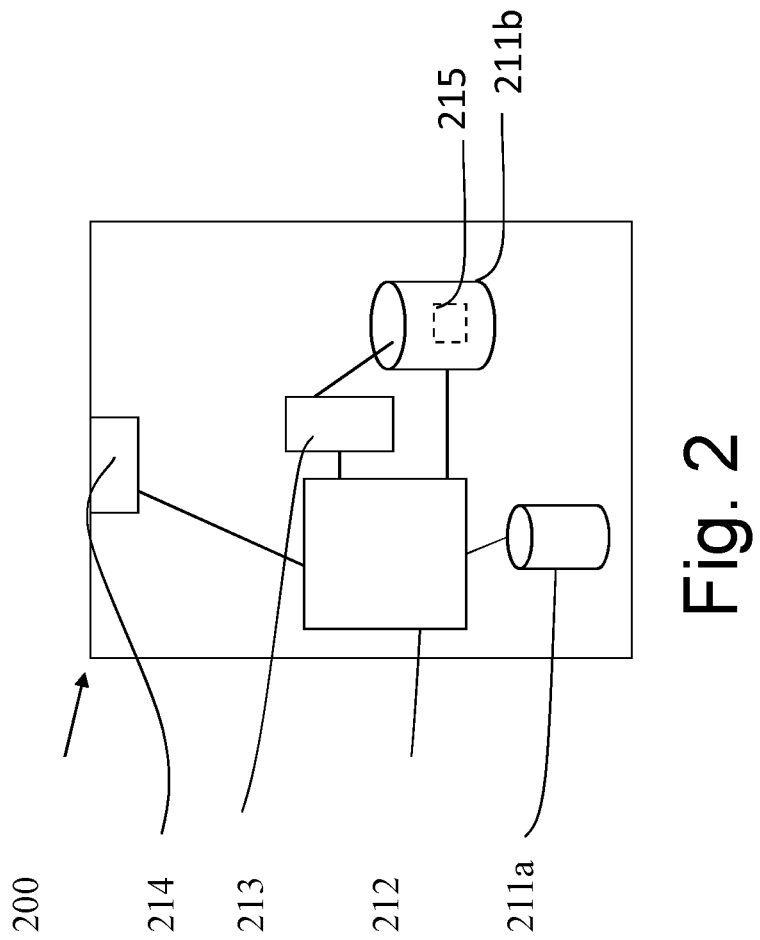
FIG. 2 shows a schematic representation of a control apparatus.

FIG. 2 illustrates an example of a control apparatus 200 for a node, for example to be integrated with, coupled to, and/or otherwise in operable communication for controlling a base station, such as the base station 106, 107, 116, 118, or 120 shown on FIG. 1. The control apparatus 200 can be arranged to allow communications between a user equipment and a core network. For this purpose the control apparatus comprises at least one random access memory (RAM) 211a and at least on read only memory (ROM) 211b, at least one processor 212, 213 and an input/output interface 214. The at least one processor 212, 213 is coupled to the RAM 211a and the ROM 211b. Via the interface, the control apparatus 200 can be coupled to relevant other components of the base station. The at least one processor 212, 213 may be configured to execute an appropriate software code 215. The software code 215 may be stored in the ROM 211b. It shall be appreciated that similar components can be provided in a control apparatus (e.g., 200) provided elsewhere in the network system, for example in a core network (CN) entity. The control apparatus 200 can be interconnected with other control entities. The control apparatus 200 and functions may be distributed between several control units. In some embodiments, each base station can comprise a control apparatus (e.g., 200). In alternative embodiments, two or more base stations may share a control apparatus (e.g., 200).

Base stations and associated controllers may communicate with each other via a fixed line connection and/or via a radio interface. The logical connection between the base stations can be provided for example by an X2 or the like interface. This interface can be used for example for coordination of operation of the base stations and performing reselection or handover operations.

Figure 3:
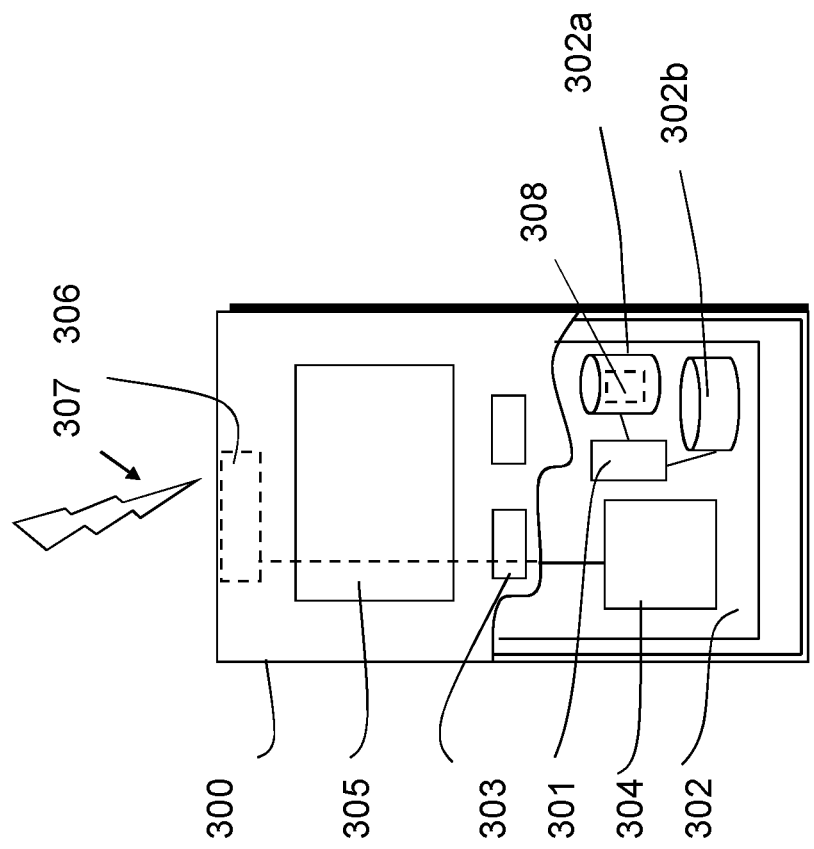
FIG. 3 shows a schematic representation of a user equipment.

FIG. 3 illustrates an example of a user equipment or wireless communication device 300, such as the wireless communication device 102, 104, or 105 shown on FIG. 1. The wireless communication device 300 may be provided by any device capable of sending and receiving radio signals. Non-limiting examples of the user equipment or wireless communication device 300 comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communication devices or any combinations of these or the like. An example of a user equipment or wireless communication device 300 may provide, for example, communication of data for carrying communications. The communications may be one or more of voice, electronic mail (email), text message, multimedia, data, machine data, and so on.

The user equipment or wireless communication device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided for example by means of a radio part and an associated antenna arrangement. The antenna arrangement may be arranged internally or externally to the user equipment or wireless communication device 300.

The user equipment or wireless communication device 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308 for example to perform the method of any of FIGS. 6 to 15. The software code 308 may be stored in the ROM 302a.

The processor 301, storage 302a, 302b, and other relevant control apparatus can be provided on an appropriate circuit board and/or in chipsets. This feature is denoted by reference 304. The user equipment or wireless communication device 300 may optionally have a user interface such as keypad 305, touch sensitive screen or pad, combinations thereof or the like. Optionally one or more of a display, a speaker and a microphone may be provided depending on the type of the user equipment or wireless communication device 300.

Figure 4:
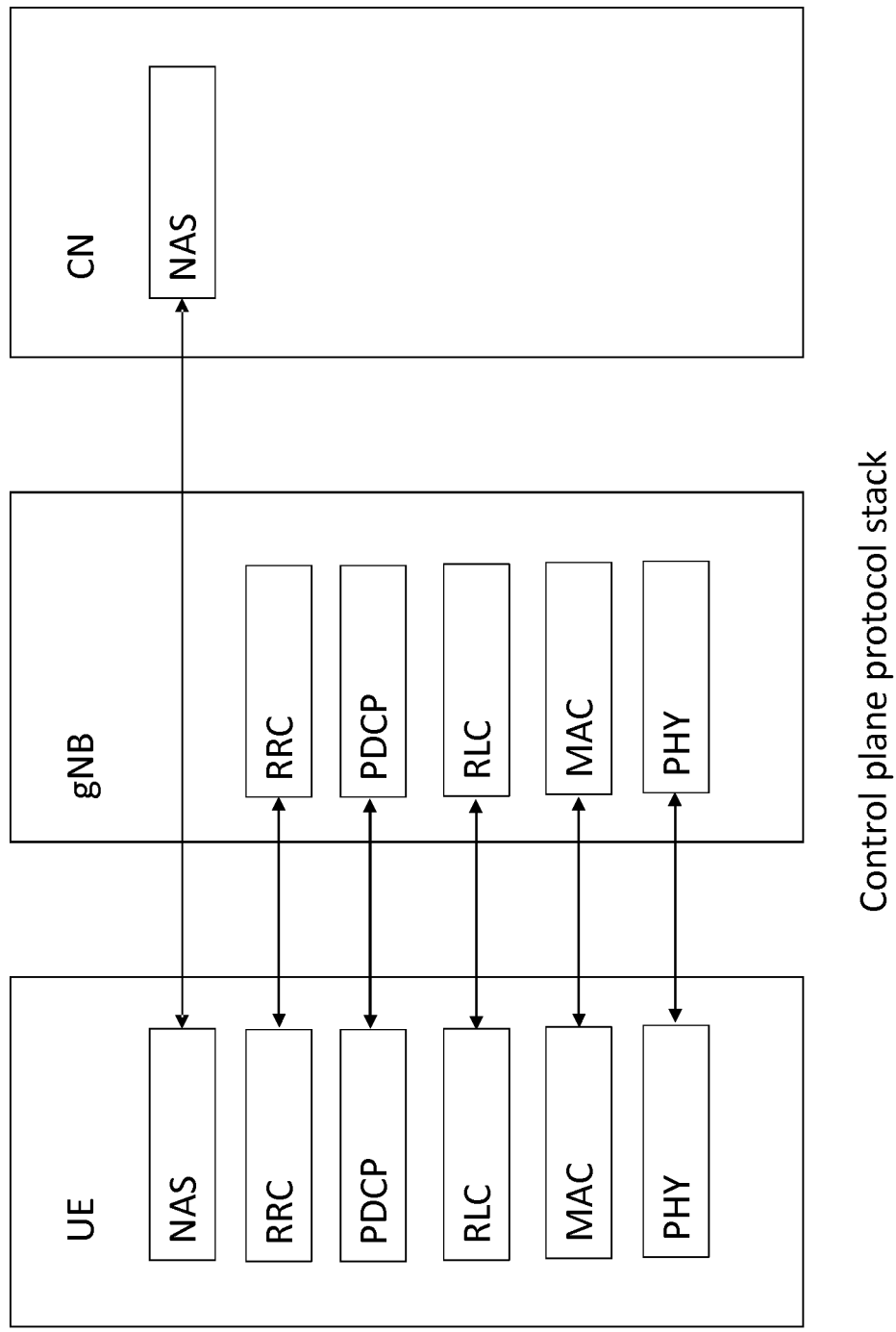
FIG. 4 shows a schematic representation of a control plane stack of a user equipment, a base station and a core network in a 5G system.

FIG. 4 shows a schematic representation of a control plane stack of a UE, a gNB, and a CN in a 5G system.

The UE comprises a physical (PHY) layer, a medium access (MAC) layer, a radio link control (RLC) layer, a packet data convergence protocol (PDCP) layer, a radio resource control (RRC) layer and a non-access stratum (NAS) layer. The gNB comprises a PHY layer, a MAC layer, an RLC layer, a PDCP layer and an RRC layer. The CN comprises a NAS layer.

Each layer of the UE, the gNB and the CN may comprise one of more functions to perform one or more procedures.

Figure 5:
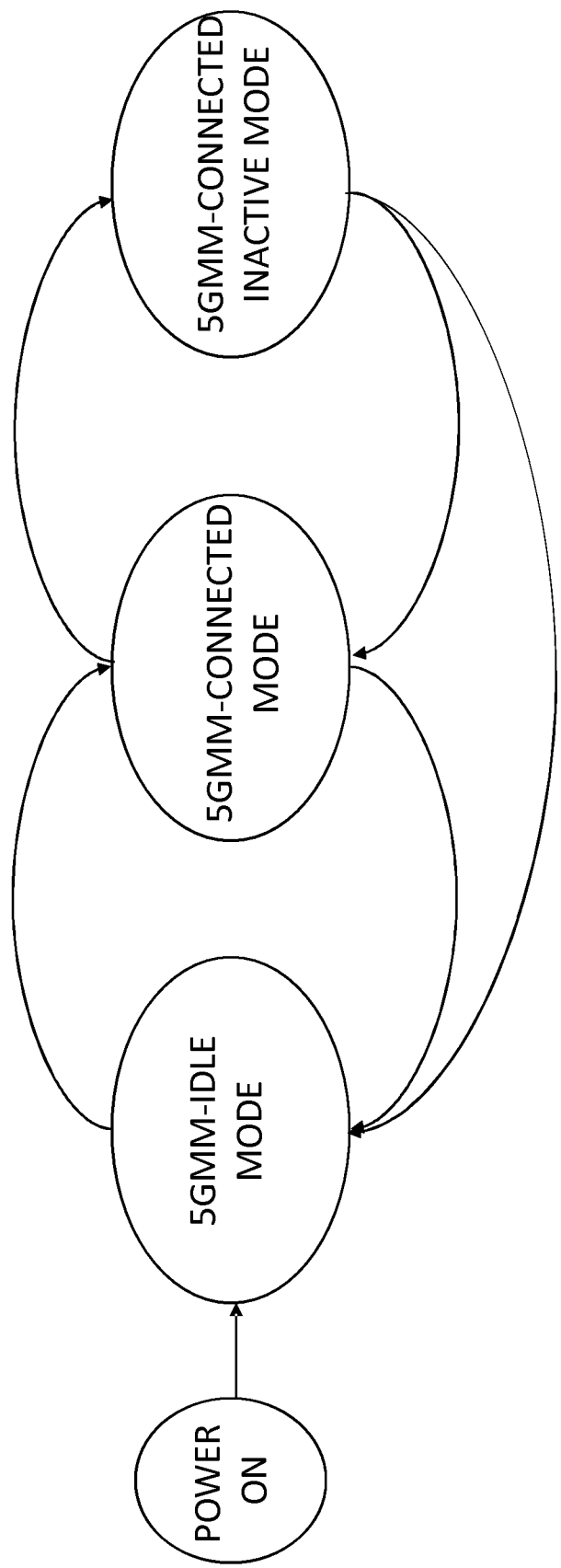
FIG. 5 shows a schematic representation of mobility management modes of a user equipment in a 5G system.

FIG. 5 shows a schematic representation of a state machine of a UE in a 5G system. The state machine comprises various 5G system mobility management (5GMM) modes such as an idle mode (e.g., 5GMM-IDLE mode), a connected mode (e.g., 5GMM-CONNECTED mode) and a connected inactive mode (e.g., 5GMM-CONNECTED mode with RRC inactive indication).

The idle mode and the connected mode may be available over 3GPP access or over non-3GPP access. The connected inactive mode may only be available over 3GPP access.

It will be understood that "3GPP access" may refer to a cellular access such as long term evolution (LTE) access or new radio (NR) access. By contrast, a non-3GPP access may refer to a non-cellular access such as a WiFi access.

Upon power on, the UE may enter the idle mode. The UE may also enter the idle mode from the connected mode or the connected inactive mode.

In the connected mode the UE may be connected with the 5G radio access network (RAN) and the 5G core network (CN) The UE may enter into the connected mode from the idle mode or the connected inactive mode.

The mode of the UE may be decided based on the existence of a NAS signalling connection between the UE and the CN (e.g., AMF). When a NAS signalling connection exists, the UE may be in connected mode. When a NAS signalling connection exists but underlying access stratum connections are suspended, the UE may be in connected inactive mode, otherwise, 5GMM-IDLE mode.

The UE may further be in a registered state (e.g., 5GMM-REGISTERED state) and deregistered state (e.g., 5GMM-DEREGISTERED state). The UE may enter the registered state when it successfully registers to a 5G System. Otherwise, the UE may be the deregistered state. The UE may be in the registered state while being in the idle mode over 3GPP access, connected mode over 3GPP access or connected inactive mode over 3GPP access.

In the connected mode the UE may be connected with the 5G RAN and the 5G CN but minimizes signalling and power consumption.

One or more of the following examples relate to 3GPP TS 24.501 which is a technical specification relating to NAS protocol for 5G systems. However, it will be understood that these examples may be transposed to different standards.

Likewise one or more of the following examples relate to 5G. However, it will be understood that these examples may be transposed to different radio access technologies.

While a UE is in 5GMM-CONNECTED mode over 3GPP access or in 5GMM-CONNECTED mode with RRC inactive indication, the UE NAS layer can receive a fallback indication from the lower layer (i.e., RRC layer). The UE RRC layer may send a fallback indication to the UE NAS layer when it receives an RRCSetup message from a gNB in response to:
    an RRCReestablishmentRequest message sent by the UE in 5GMM-CONNECTED mode over 3GPP access; or
    an RRCResumeRequest message sent by the UE in 5GMM-CONNECTED mode with RRC inactive indication.

In general, after receiving a fallback indication, the UE NAS layer initiates a NAS procedure. Further details on the UE's behavior upon receipt of the fallback indication can differ according to:

mode of the UE when the UE receives the fallback indication;

existence of pending uplink user data; and existence of a pending NAS procedure and the type of the pending NAS procedure.

As described herein, a NAS procedure may refer to a registration procedure, a service request procedure, a de-registration procedure, a notification procedure, a paging procedure, a NAS transport procedure, a 5GMM state procedure, a primary authentication and key agreement procedure, a security mode control procedure, identification procedure, generic UE configuration update procedure, or another such procedure.

According to 3GPP TS 24.501, the UE may initiate either a registration procedure, a service request procedure, or a de-registration procedure if a UE has pending uplink user data or a pending 5GMM procedure. 3GPP TS 24.501 further describes that in some cases, the uplink (UL) data status IE in a REGISTRATION REQUEST or SERVICE REQUEST message may indicates the PDU session(s) for which user-plane resources were active prior to receiving the fallback indication.

A shortcoming of 3GPP TS 24.501 is that it incorrectly describes or ignores various cases wherein a NAS layer of a UE may invoke a service request procedure or a registration procedure upon receipt of a fallback indication from an RRC layer. As a result, TS 24.501 does not describe the setting of a service type information element (IE) in a SERVICE REQUEST message at all and incompletely describes the setting of the UL data status IE in a SERVICE REQUEST message or a REGISTRATION REQUEST message when a UE invokes a service request procedure or a registration procedure.

One or more of the following examples address certain of the deficiencies of 3GPP TS 24.501 by supplementing existing cases a), b), c), d), e), f), g), and h), which are not related to a fallback indication from the lower layers (in section 5.6.1.1 of 3GPP TS 24.501) with cases i), j), k), and l) dealing with a service request procedure initiated upon receipt of a fallback indication from the lower layers.

In case i), the UE may be in connected mode over a 3GPP access or is in connected inactive mode. A NAS layer function may receive a fallback indication from an RRC layer function. The UE may have pending uplink user data and no pending NAS procedure.

In case j), the UE may be in connected mode over a 3GPP access or is in connected inactive mode. A NAS layer function may receive a fallback indication from an RRC layer function. The UE may have a pending service request procedure invoked due to another reason than emergency service fallback (ESFB).

For example, the pending service request procedure may have been invoked because the UE received, over a 3GPP access, a NOTIFICATION message with an access type IE indicating non-3GPP access.

Alternatively, the pending service request procedure may have been invoked because the UE, which was in connected mode or in connected inactive mode, had user data pending due to non-user plane resources established for PDU sessions used for user data transport.

In case k), the UE may be in connected mode over a 3GPP access or is in connected inactive mode. A NAS layer function may receive a fallback indication from an RRC layer function. The UE may have a pending service request procedure invoked due to ESFB.

In case l), the UE may be in connected mode over a 3GPP access or is in connected inactive mode. A NAS layer function may receive a fallback indication from an RRC layer function. The UE may have a pending NAS procedure other than a registration, service request, or de-registration procedure.

One or more of the following examples address further deficiencies of 3GPP TS 24.501 by setting the service type IE in a SERVICE REQUEST message as follow.

When case i) is fulfilled, the service type IE in a SERVICE REQUEST may be set to 'high priority access', 'emergency services', or 'data'.

When case j) is fulfilled, the service type IE in a SERVICE REQUEST may be set to 'mobile terminated services', 'high priority access', 'emergency services', or 'data'.

When case k) is fulfilled, the service type IE in a SERVICE REQUEST may be set to 'ESFB'.

When case l) is fulfilled, the service type IE in a SERVICE REQUEST may be set to 'emergency services', 'high priority access', or 'signalling'.

One or more of the following examples further address deficiencies of 3GPP TS 24.501 by setting the UL data status IE in a SERVICE REQUEST as follow.

When case i) is fulfilled, the UL data status IE in a SERVICE REQUEST may indicate PDU sessions for which user-plane resources were active prior to receiving the fallback indication.

When case j) is fulfilled, the UL data status IE in a SERVICE REQUEST may indicate PDU sessions for which user-plane resources were active prior to receiving the fallback indication (if any) and/or PDU sessions for which user-plane resources were not active prior to receiving the fallback indication and the UE has pending user data to be sent over 3GPP access (if any).

When case k) is fulfilled, the UL data status IE in a SERVICE REQUEST may be unspecified.

When case l) is fulfilled, the UL data status IE in a SERVICE REQUEST may indicate PDU sessions for which user-plane resources were active prior to receiving the fallback indication (if any), when the UE is in connected mode. The UL data status IE may not be included in the SERVICE REQUEST message when the UE is in connected inactive mode, e.g., if the UE has no always-on PDU session. If the UE in connected inactive mode has one or more always-on PDU session, the UE may indicate the always-on PDU sessions via the UL data status IE in the SERVICE REQUEST message. In order to achieve simplicity, irrespective of the mode of a UE (i.e., either connected mode or connected inactive mode), the UL data status IE in a SERVICE REQUEST may indicate PDU sessions for which user-plane resources were active prior to receiving the fallback indication (if any).

In all cases i), j), k), and l), if the UE has one or more always-on PDU sessions and the user-plane resources for these PDU sessions are not active, the UE may include the UL data status IE in the SERVICE REQUEST message and indicate that the UE has pending user data to be sent for those PDU sessions.

The following example addresses deficiencies of 3GPP TS 24.501 by setting the UL data status IE in a REGISTRATION REQUEST message as follows:

The UE may be in connected mode over a 3GPP access or in connected inactive mode. A NAS layer function may receive a fallback indication from an RRC layer function. The UE may have a pending registration procedure. In this case, the UL data status IE in a REGISTRATION REQUEST message may indicate PDU sessions for which user-plane resources were active prior to receiving the fallback indication (if any) and/or PDU sessions for which user-plane resources were not active prior to receiving the fallback indication and the UE has pending user data to be sent over 3GPP access (if any).

Figure 6:
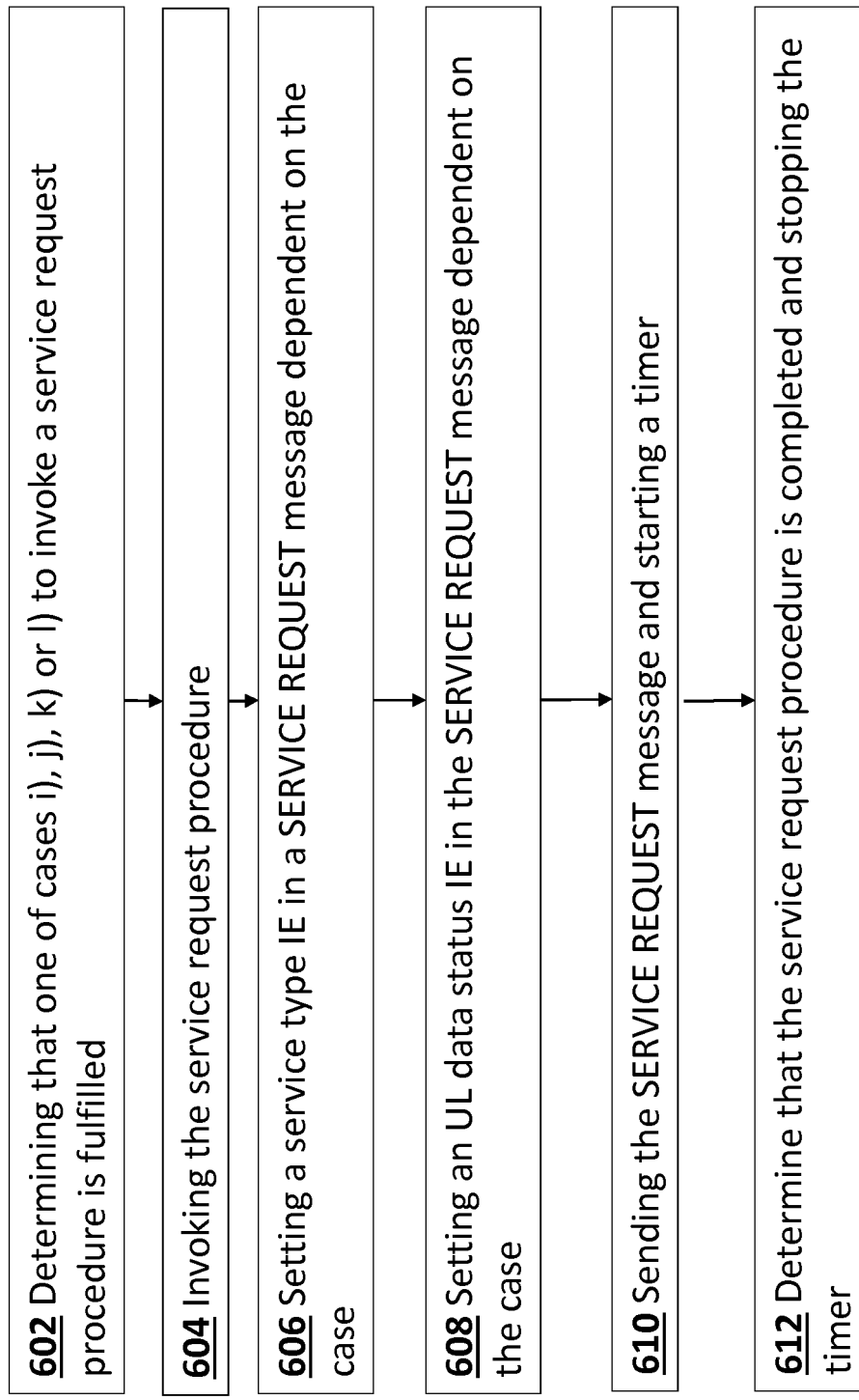
FIG. 6 shows a schematic representation of a diagram of a method of performing a service request procedure.

FIG. 6 shows a schematic representation of a diagram of a method of performing a service request procedure. The method may be performed by a UE and more specifically by a NAS layer function.

In step 602, the NAS layer function of the UE may determine that one of the cases i), j), k), or l) to invoke a service request procedure is fulfilled.

In step 604, the NAS layer function of the UE may invoke the service request procedure.

In step 606, the NAS layer function of the UE may set a service type IE in a SERVICE REQUEST message dependent on the case that is fulfilled. That is, the NAS layer function of the UE may set a service type IE in a SERVICE REQUEST message differently when cases i), j), k), or l) are fulfilled. This step will be discussed in more details in reference to FIGS. 8, 9, 11 and 13.

In step 608, the NAS layer function of the UE may set an UL data status IE in the SERVICE REQUEST message dependent on the case that is fulfilled. That is, the NAS layer function of the UE may set an UL data status IE in a SERVICE REQUEST message differently when cases i), j), k), or l) are fulfilled. This step will be discussed in more details in reference to, e.g., FIGS. 7, 10, and 12.

In step 610, the NAS layer function of the UE may send the SERVICE REQUEST message to a NAS layer function of the CN. The NAS layer function of the CN may be an access management function (AMF). The NAS layer function of the UE may start a service request retransmission timer (e.g., T3517). The NAS layer function of the UE may increment a service request attempt counter.

In step 612, the NAS layer function of the UE may determine that the service request procedure is complete. The determination may depend on the case that is fulfilled.

For example, the NAS layer function of the UE may determine that the service request procedure is complete upon receiving a SERVICE ACCEPT message from the NAS layer function of the CN when one of cases i), j), or k) is fulfilled. The NAS layer function of the UE may then stop the service request retransmission timer and may reset the service request attempt counter.

Alternatively, the NAS layer function of the UE may determine that the service request procedure is completed upon receiving an indication from an RRC layer function of the UE that the UE has changed to S1 mode or E-UTRA connected to 5GCN when case l) is fulfilled. The NAS layer function of the UE may then stop the service request retransmission timer.

Figure 7:
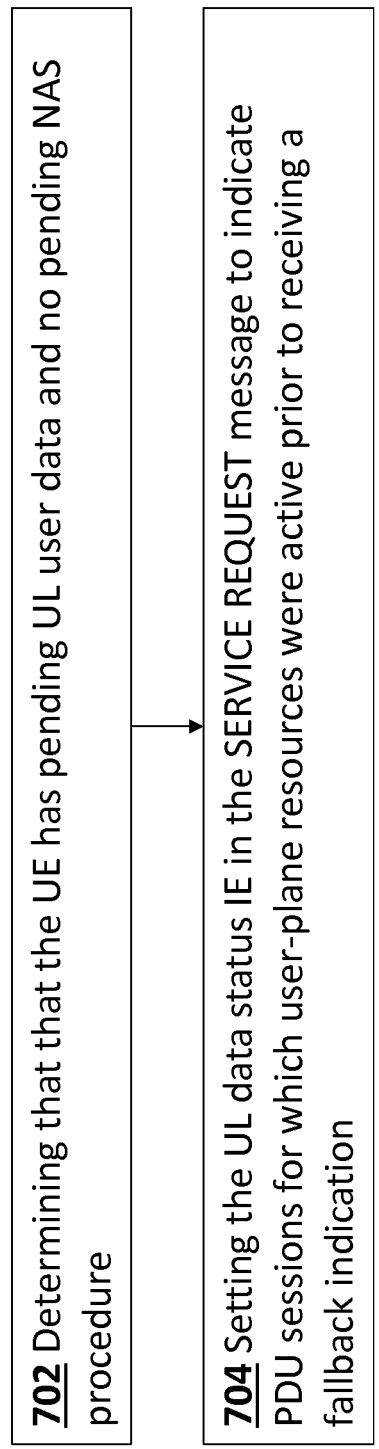
FIG. 7 shows a schematic representation of a diagram of a method of setting an uplink data status information element in a SERVICE REQUEST message when case i) is fulfilled.

FIG. 7 shows a schematic representation of a diagram of a method of setting an UL data status IE in a SERVICE REQUEST message when case i) is fulfilled. The method may be performed by a UE and more specifically by a NAS layer function.

In step 702, the NAS function of the UE may determine that case i) is fulfilled. In particular, the NAS function of the UE may determine that the UE has pending UL user data and no pending NAS procedure.

In step 704, the NAS function of the UE may set the UL data status IE in the SERVICE REQUEST message to indicate packet data unit (PDU) sessions for which user-plane resources were active prior to receiving a fallback indication. The fallback indication may be received from an RRC layer function of the UE.

Figure 8:
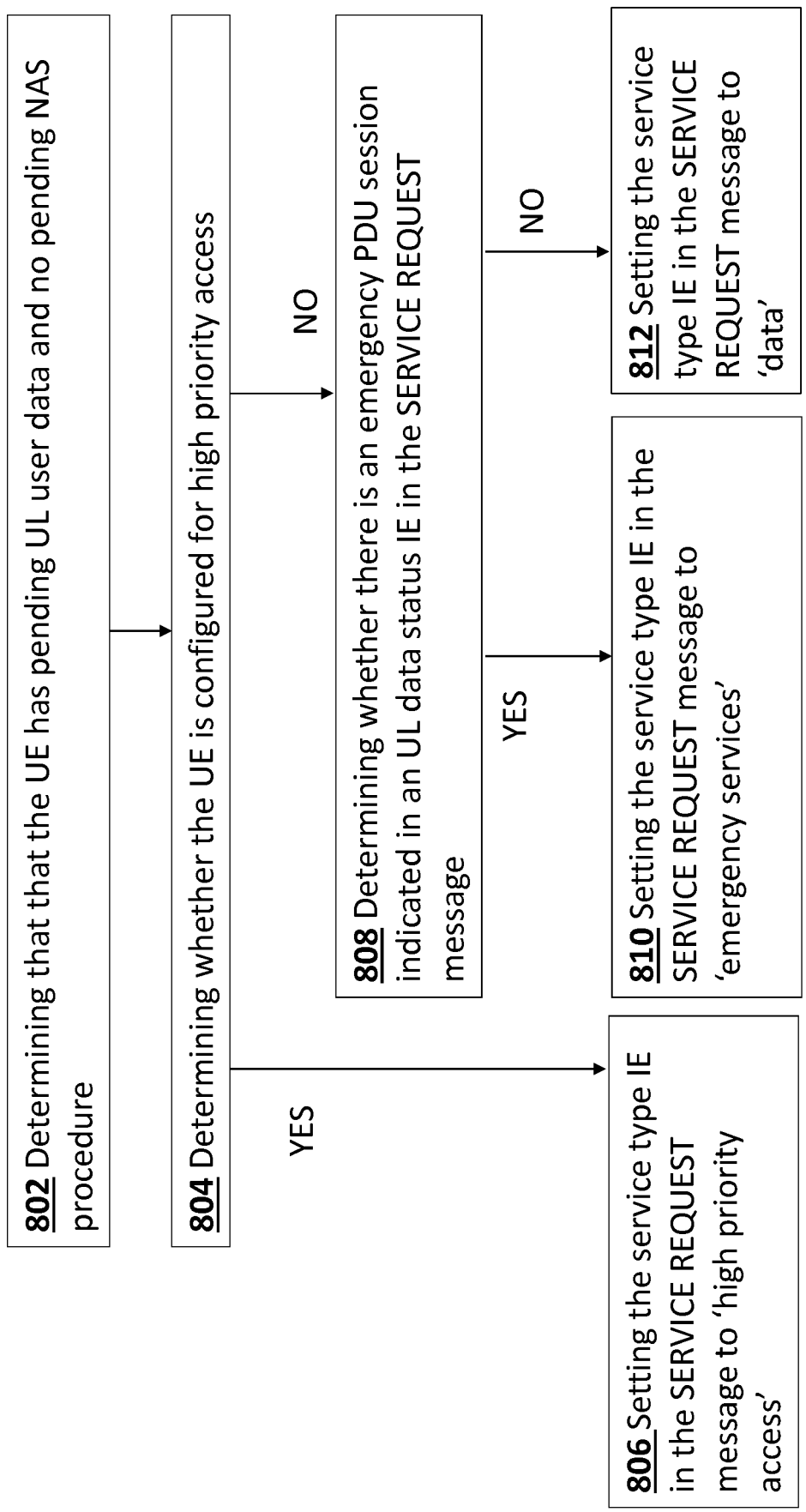
FIG. 8 shows a schematic representation of a diagram of a method of setting a service type information element in a SERVICE REQUEST message when case i) is fulfilled.

FIG. 8 shows a schematic representation of a diagram of a method of setting a service type IE in a SERVICE REQUEST message when case i) is fulfilled. The method may be performed by a UE and more specifically by a NAS layer function.

In step 802, the NAS layer function of the UE may determine that case i) is fulfilled. In particular, the NAS function of the UE may determine that the UE has pending UL user data and no pending NAS procedure.

In step 804, the NAS layer function of the UE may determine whether the UE is configured for high priority access in a selected public land mobility network (PLMN). If the UE is configured for high priority access in the selected PLMN, the method goes to step 806. If the UE is not configured for high priority access in the selected PLMN, the method goes to step 808.

In step 806 (i.e., the UE is configured for high priority access in the selected PLMN), the NAS layer function of the UE may set the service type IE in the SERVICE REQUEST message to 'high priority access'.

In step 808 (i.e., the UE is not configured for high priority access in the selected PLMN), the NAS layer function of the UE may determine whether there is an emergency PDU session indicated in an UL data status IE in the SERVICE REQUEST message. If there is an emergency PDU session indicated in an UL data status IE in the SERVICE REQUEST message, the method goes to step 810. If there is no emergency PDU session indicated in an UL data status IE in the SERVICE REQUEST message, the method goes to step 812.

In step 810 (i.e., there is an emergency PDU session indicated in an UL data status IE in the SERVICE REQUEST message), the NAS layer function of the UE may set the service type IE in the SERVICE REQUEST message to 'emergency services'.

In step 812 (i.e., there is no emergency PDU session indicated in an UL data status IE in the SERVICE REQUEST message), the NAS layer function of the UE may set the service type IE in the SERVICE REQUEST message to 'data'.

FIG. 9 shows a schematic representation of a diagram of a method of setting an UL data status IE in a SERVICE REQUEST message when case j) is fulfilled. The method may be performed by a UE and more specifically by a NAS layer function.

In step 902, the NAS function of the UE may determine that case j) is fulfilled. In particular, the NAS function of the UE may determine that the UE has a pending service request procedure invoked due to another reason than emergency service fallback (ESFB).

For example, the pending service request procedure may have been invoked because the UE received, over a 3GPP access, a NOTIFICATION message with access type indicating non-3GPP access.

Alternatively, the pending service request procedure may have been invoked because the UE, which was in connected mode or in connected inactive mode, had user data pending due to non-user plane resources established for PDU sessions used for user data transport.

In step 904, the NAS function of the UE may set the UL data status IE in the SERVICE REQUEST message to indicate PDU sessions for which user-plane resources were active prior to receiving a fallback indication from an RRC layer entity. Alternatively or additionally, the NAS function of the UE may set the UL data status IE in the SERVICE REQUEST message to indicate PDU sessions for which user-plane resources were not active prior to receiving the fallback indication and the UE has pending user data to be sent over 3GPP access, if any.

Figure 10:
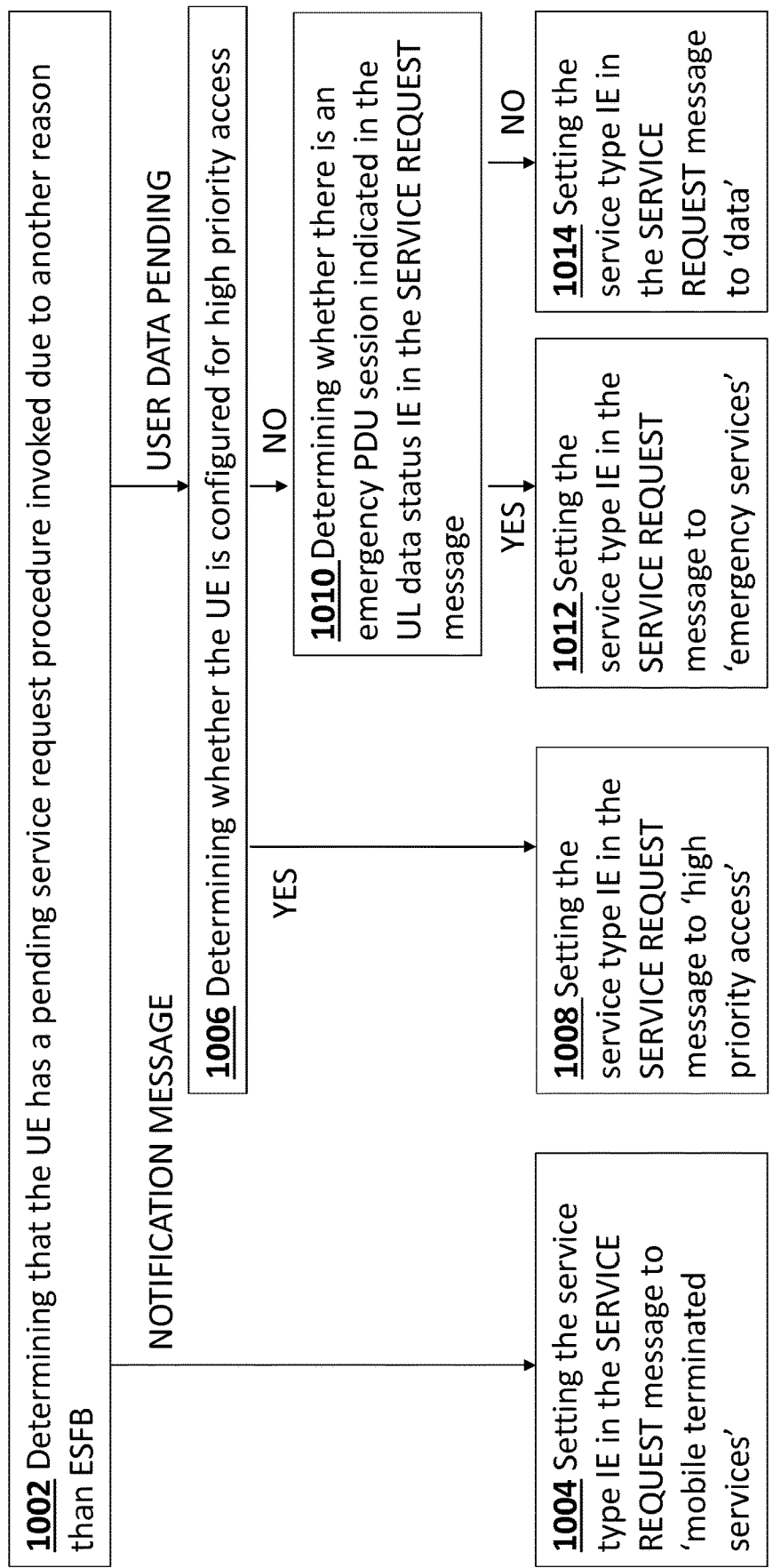
FIG. 10 shows a schematic representation of a diagram of a method of setting a service type information element in a SERVICE REQUEST message when the case j) is fulfilled.

FIG. 10 shows a schematic representation of a diagram of a method of setting a service type IE in a SERVICE REQUEST message when case j) is fulfilled. The method may be performed by a UE and more specifically by a NAS layer function.

In step 1002, the NAS layer function of the UE may determine case j) is fulfilled. In particular, the NAS function of the UE may determine that the UE has a pending service request procedure invoked due to another reason than ESFB.

If the pending service request procedure has been invoked because the UE received, over a 3GPP access a NOTIFICATION message with access type indicating non-3GPP access, the method goes to step 1004.

If the pending service request procedure has been invoked because the UE, which was in connected mode or in connected inactive mode, had user data pending due to non-user plane resources established for PDU sessions used for user data transport, the method goes to step 1006.

In step 1004 (i.e., the pending service request procedure has been invoked because the UE received, over a 3GPP access, a NOTIFICATION message with access type indicating non-3GPP access, the NAS layer function of the UE may set the service type IE in the SERVICE REQUEST message to 'mobility terminated services'.

In step 1006 (i.e., the pending service request procedure has been invoked because the UE, which was in connected mode, had user data pending due to non-user plane resources established for PDU sessions used for user data transport), the NAS layer function of the UE may determine whether the UE is configured for high priority access in a selected public land mobility network (PLMN).

If the UE is configured for high priority access in the selected PLMN, the method goes to step 1008. If the UE is not configured for high priority access in the selected PLMN, the method goes to step 1010.

In step 1008 (i.e., the UE is configured for high priority access in the selected PLMN), the NAS layer function of the UE may set the service type IE in the SERVICE REQUEST message to 'high priority access'.

In step 1010 (i.e., the UE is not configured for high priority access in the selected PLMN), the NAS layer function of the UE may determine whether there is an emergency PDU session indicated in an UL data status IE in the SERVICE REQUEST message.

If there is an emergency PDU session indicated in an UL data status IE in the SERVICE REQUEST message, the method goes to step 1012. If there is no emergency PDU session indicated in an UL data status IE in the SERVICE REQUEST message, the method goes to step 1014.

In step 1012 (i.e., there is an emergency PDU session indicated in an UL data status IE in the SERVICE REQUEST message), the NAS layer function of the UE may set the service type IE in the SERVICE REQUEST message to 'emergency services'.

In step 1014 (i.e., there is no emergency PDU session indicated in an UL data status IE in the SERVICE REQUEST message), the NAS layer function of the UE may set the service type IE in the SERVICE REQUEST message to 'data'.

Alternatively or additionally, the NAS layer function of the UE may determine whether to include an allowed PDU session status IE in the SERVICE REQUEST message. For example, the NAS layer function of the UE may determine to include the allowed PDU session status IE in the SERVICE REQUEST message if the UE invoked the pending service request procedure because the UE received, over 3GPP access, a NOTIFICATION message with access type indicating non-3GPP access.

The NAS layer function of the UE may then determine whether the UE has one or more PDU sessions over non-3GPP access associated with a single network slice selection assistance information (S-NSSAI) included in an allowed network slice selection assistance information (NSSAI) for 3GPP access and the UE allows the user-plane resources for the PDU sessions over non-3GPP access to be re-established over 3GPP access.

If the UE has one or more PDU sessions over non-3GPP access associated with a S-NSSAI included in an allowed NSSAI for 3GPP access and the UE allows the user-plane resources for the PDU sessions over non-3GPP access to be re-established over 3GPP access, the UE may set the allowed PDU session status IE to indicate the one or more PDU sessions.

If the UE has no PDU sessions over non-3GPP access associated with an S-NSSAI included in the allowed NSSAI for 3GPP access or the UE allows the user-plane resources for the PDU sessions over non-3GPP access to be re-established over 3GPP access, the UE may set the allowed PDU session status IE to indicate no PDU session.

Figure 11:
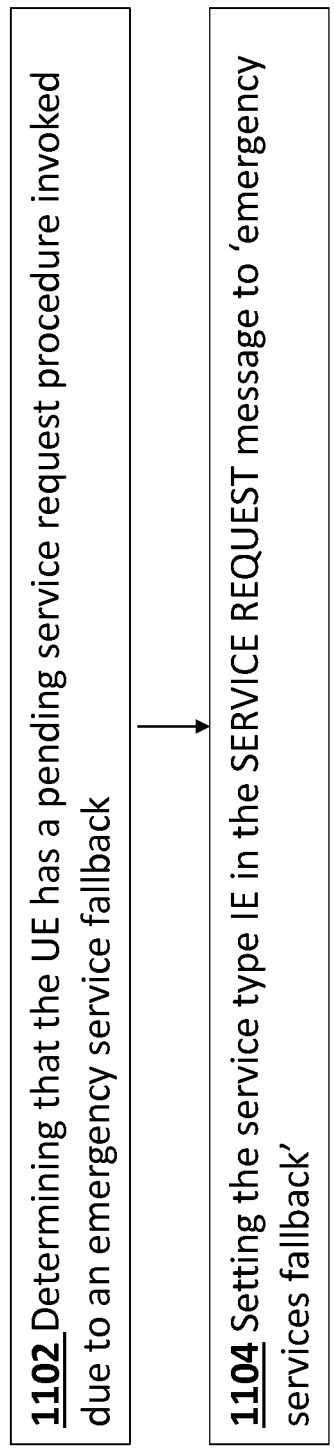
FIG. 11 shows a schematic representation of a diagram of a method of setting a service type information element in a SERVICE REQUEST message when a case k) is fulfilled.

FIG. 11 shows a schematic representation of a diagram of a method of setting a service type IE in a SERVICE REQUEST message when the case k) is fulfilled. The method may be performed by a user equipment and in particular a NAS function.

In step 1102, the NAS function of the UE may determine that case k) is fulfilled. In particular, the NAS function of the UE may determine that the UE has a pending service request procedure invoked due to an emergency service fallback.

In step 1104, the NAS function of the UE may set the UL service type IE in the SERVICE REQUEST message to 'emergency services fallback'.

Figure 12:
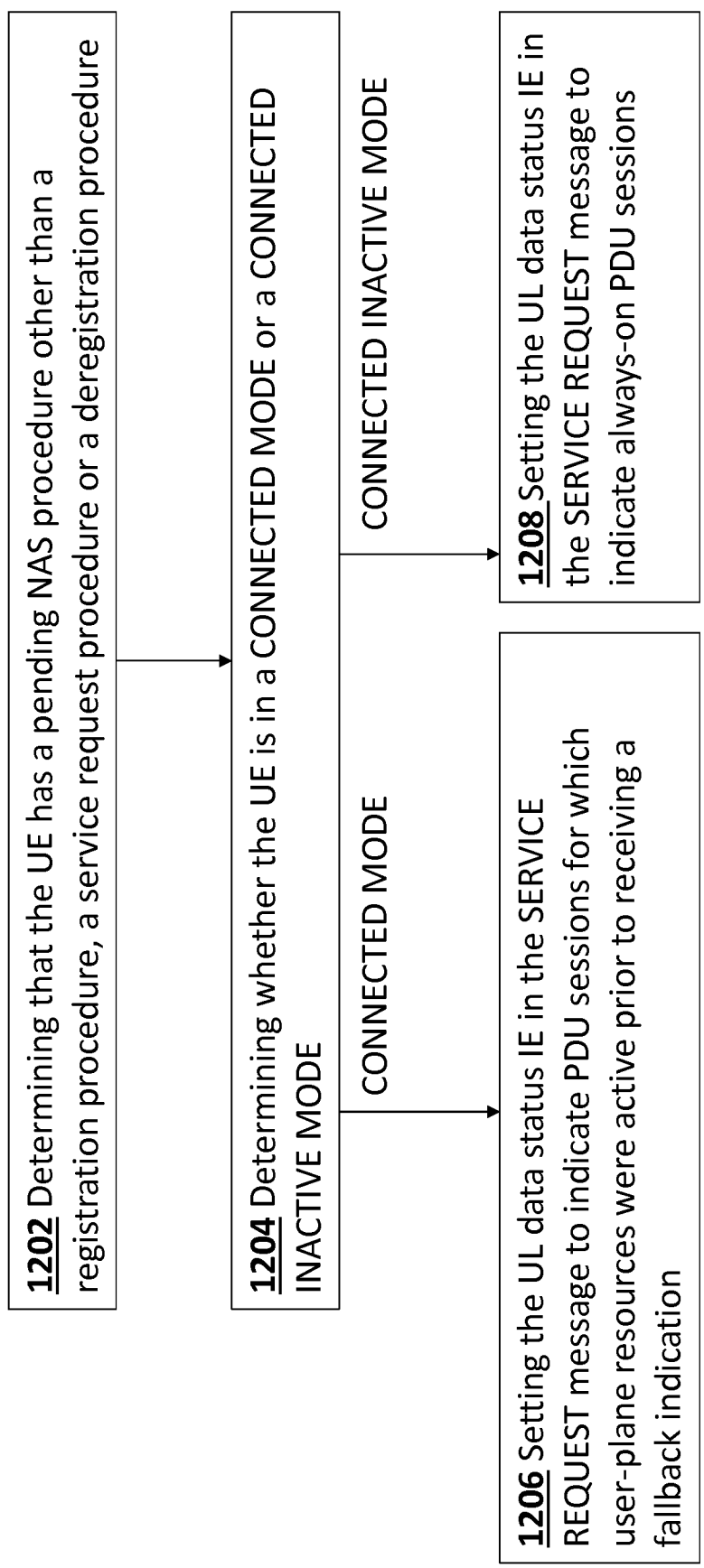
FIG. 12 shows a schematic representation of a diagram of a method of setting an uplink data status information element in a SERVICE REQUEST message when a case l) is fulfilled.

FIG. 12 shows a schematic representation of a diagram of a method of setting an UL data status IE in a SERVICE REQUEST message when case l) is fulfilled. The method may be performed by a user equipment and in particular a NAS function.

In step 1202, the NAS function of the UE may determine that case l) is fulfilled. In particular, the NAS function of the UE may determine that the UE has a pending NAS procedure other than a registration procedure, a service request procedure or a deregistration procedure.

In step 1204, the NAS function of the UE may determine whether the UE is in connected mode or connected inactive mode. If the UE is in connected mode, the method goes to 1206. If the UE is in connected inactive mode, the method goes to 1208.

In step 1206, the NAS function of the UE may set the UL data status IE in the SERVICE REQUEST message to indicate PDU sessions for which user-plane resources were active prior to receiving a fallback indication, if any. The fallback indication may be received from an RRC layer function of the UE.

In step 1208, the NAS function of the UE may set the UL data status IE in the SERVICE REQUEST message to indicate always-on PDU sessions, if any. If there is no always-on PDU sessions the NAS function of the UE may not include the UL data status IE in the SERVICE REQUEST message.

Figure 13:
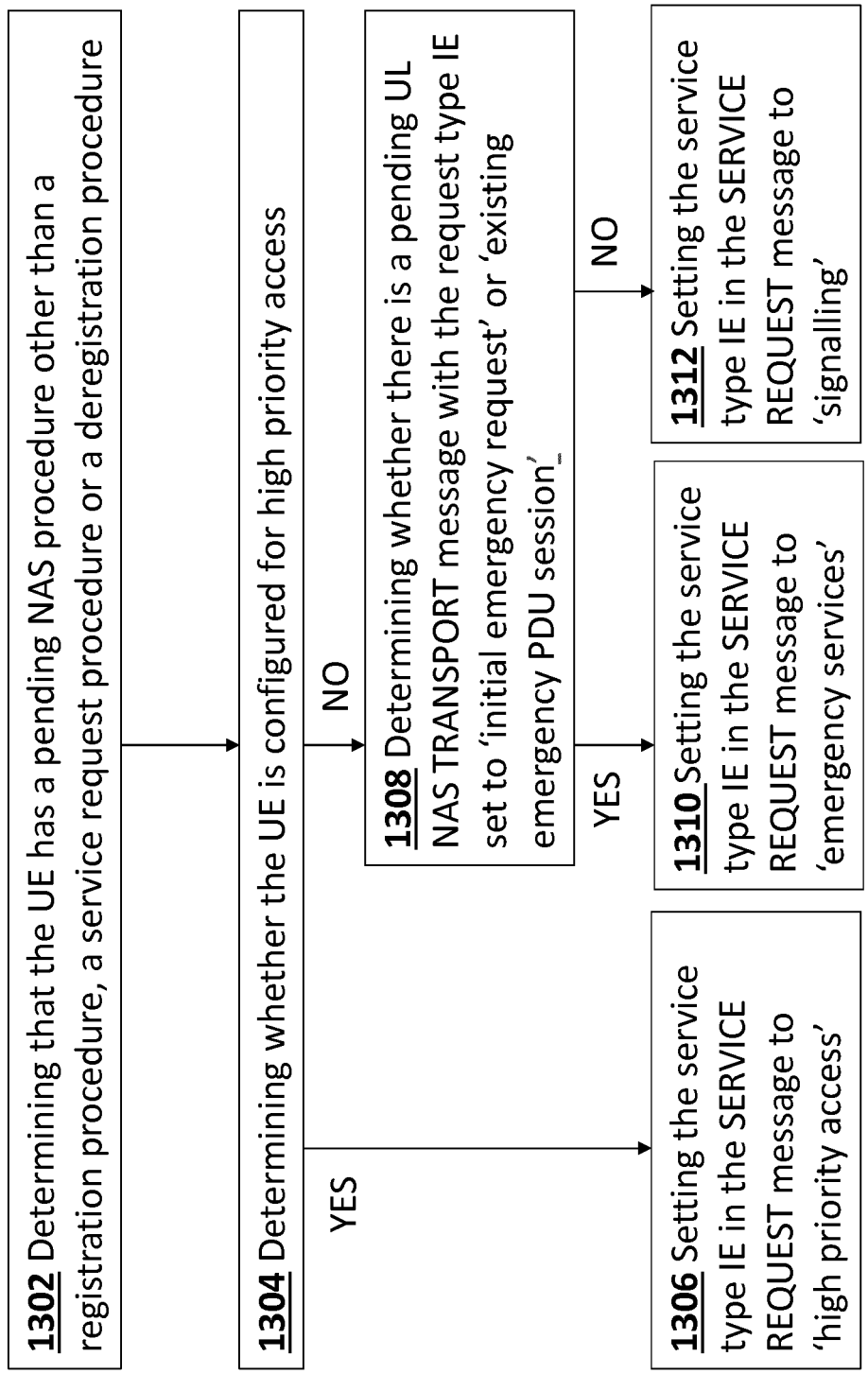
FIG. 13 shows a schematic representation of a diagram of a method of setting a service type information element in a SERVICE REQUEST message when the case l) is fulfilled.

FIG. 13 shows a schematic representation of a diagram of a method of setting a service type IE in a SERVICE REQUEST message when the case 1) is fulfilled.

In step 1302, the NAS function of the UE may determine that case 1) is fulfilled. In particular, the NAS function of the UE may determine that the UE has a pending NAS procedure other than a registration procedure, a service request procedure or a deregistration procedure.

In step 1304, NAS layer function of the UE may determine whether the UE is configured for high priority access in a selected public land mobility network (PLMN).

If the UE is configured for high priority access in the selected PLMN, the method goes to step 1306. If the UE is not configured for high priority access in the selected PLMN, the method goes to step 1308.

In step 1306 (i.e., the UE is configured for high priority access in the selected PLMN), the NAS layer function of the UE may set the service type IE in the SERVICE REQUEST message to 'high priority access'.

In step 1308 (i.e., the UE is not configured for high priority access in the selected PLMN), the NAS layer function of the UE may determine whether there is an UL NAS TRANSPORT message with the request type IE set to 'initial emergency request' or 'existing emergency PDU session'.

If there is a pending UL NAS TRANSPORT message with the request type IE set to 'initial emergency request' or 'existing emergency PDU session', the method goes to step 1310. If there is no pending UL NAS TRANSPORT message with the request type IE set to 'initial emergency request' or 'existing emergency PDU session', the method goes to step 1312.

In step 1310 (i.e., there is a pending UL NAS TRANSPORT message with the request type IE set to 'initial emergency request' or 'existing emergency PDU session'), the NAS layer function of the UE may set the service type IE in the SERVICE REQUEST message to 'emergency services'.

In step 1312 (i.e., there is no pending UL NAS TRANSPORT message with the request type IE set to 'initial emergency request' or 'existing emergency PDU session'), the NAS layer function of the UE may set the service type IE in the SERVICE REQUEST message to 'signalling'.

Figure 14:
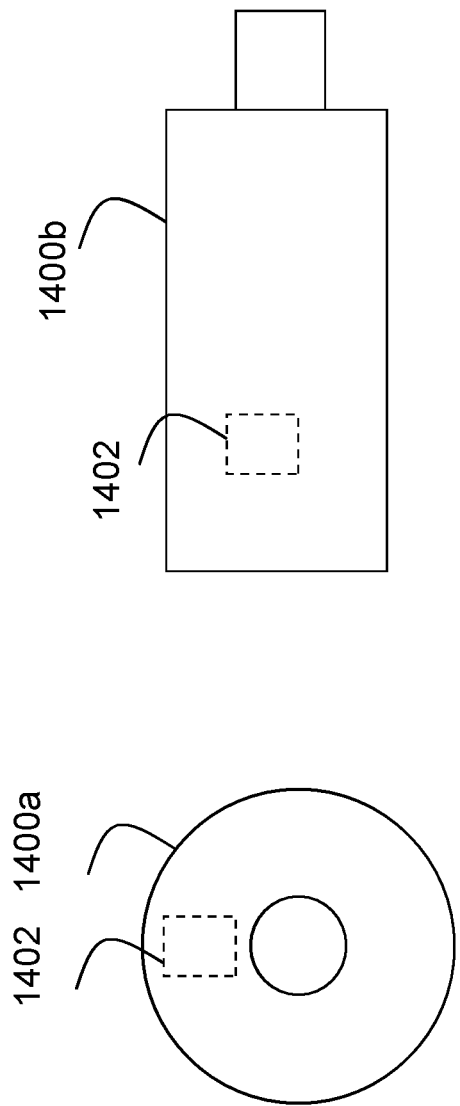
FIG. 14 shows a schematic representation of a non-volatile memory medium storing instructions which when executed by a processor allow a processor to perform one or more of the steps of the method of any of FIGS. 6 to 13.

FIG. 14 shows a schematic representation of non-volatile memory media 1400a (e.g., computer disc (CD) or digital versatile disc (DVD)) and 1400b (e.g., universal serial bus (USB) memory stick) storing instructions and/or parameters 1402 which when executed by a processor allow the processor to perform one or more of the steps of the methods of FIGS. 6 to 13.

It will be understood that one or more of the above examples may be incorporated in a modified version of 3GPP TS 24.501, for example by incorporating one or more of the following sections.

With regard to re-establishment of the N1 NAS signaling connection, when the UE in 5GMM-CONNECTED mode over 3GPP access receives a fallback indication from lower layers, and the UE has pending uplink user data but no pending NAS procedure, the UE shall:
  a) enter 5GMM-IDLE mode; and
  b) initiate the service request procedure.

When the UE in 5GMM-CONNECTED mode over 3GPP access receives a fallback indication from lower layers, and the UE has a pending registration procedure, service request procedure, or de-registration procedure, the UE shall:
  a) enter 5GMM-IDLE mode, and
  b) proceed with the pending procedure.

When the UE in 5GMM-CONNECTED mode over 3GPP access receives a fallback indication from lower layers, and the UE has a pending NAS procedure other than a registration procedure, a service request procedure, or a de-registration procedure, the UE shall:
  a) enter 5GMM-IDLE mode;
  b) initiate the service request procedure; and
  c) upon successful service request procedure completion, proceed with any pending procedure.

In certain aspects, a UE can be in 5GMM-CONNECTED mode with a CN over an access node/network, e.g., over a 3GPP access node/network.

In some embodiments, the UE is in 5GMM-CONNECTED mode with RRC inactive indication when the UE is in:
  a) 5GMM-CONNECTED mode over 3GPP access at the NAS layer; and
  b) RRC_INACTIVE state at the AS layer.

Unless stated otherwise, the UE behavior in 5GMM-CONNECTED mode with RRC inactive indication follows the UE behavior in 5GMM-CONNECTED over 3GPP access, except that:
  a) the UE shall apply the mobility restrictions; and
  b) the UE shall perform the PLMN selection procedures as in 5GMM-IDLE mode over 3GPP access.

The UE shall transition from 5GMM-CONNECTED mode over 3GPP access to 5GMM-CONNECTED mode with RRC inactive indication upon receiving an indication from the lower layers that the UE has transitioned to RRC_INACTIVE state.

Upon:
  a trigger of a procedure which requires sending of a NAS message; or
  an uplink user data packet to be sent for a PDU session with suspended user-plane resources;
  the UE in 5GMM-CONNECTED mode with RRC inactive indication over 3GPP access shall request the lower layers to transition to RRC_CONNECTED state.

The UE shall transition from 5GMM-CONNECTED mode with RRC inactive indication to 5GMM-CONNECTED mode over 3GPP access upon receiving an indication from the lower layers that the UE has transitioned to RRC_CONNECTED state.

In some embodiments, the AMF can be aware of the transition between 5GMM-CONNECTED mode and 5GMM-CONNECTED mode with RRC inactive indication for a UE.

The UE shall trigger a transition from 5GMM-CONNECTED mode with RRC inactive indication to 5GMM-IDLE mode upon selection of a PLMN that is not an equivalent PLMN to the registered PLMN. The UE shall not trigger a transition from 5GMM-CONNECTED mode with RRC inactive indication to 5GMM-IDLE mode upon entering a new PLMN which is in the list of equivalent PLMNs.

If the UE requests the lower layers to transition to RRC_CONNECTED state at
  initiation of a registration procedure, a service request procedure or a de-registration procedure, upon fallback indication from lower layers, the UE shall:
    enter 5GMM-IDLE mode; and
    proceed with the pending procedure.

If the UE requests the lower layers to transition to RRC_CONNECTED state for other reason than initiation of a registration procedure, a service request procedure, or a de-registration procedure, upon fallback indication from lower layers, the UE shall:
    enter 5GMM-IDLE mode;
    initiate service request procedure; and
    upon successful service request procedure completion, proceed with any pending procedure.

If the UE in 5GMM-CONNECTED mode with RRC inactive indication receives a fallback indication from lower layers, and the UE has pending uplink user data but no pending NAS procedure, the UE shall:

enter 5GMM-IDLE mode; and initiate the service request procedure.

The UE shall transition from 5GMM-CONNECTED mode with RRC inactive indication to 5GMM-IDLE mode over 3GPP access and initiate the registration procedure for mobility and periodic registration update used for mobility (i.e., the 5GS registration type IE set to "mobility registration updating" in the REGISTRATION REQUEST message) for NAS signalling connection recovery upon receiving from the lower layers:

a) indication that the transition from RRC_INACTIVE state to RRC_CONNECTED state has failed; or b) fallback indication without resume request from NAS.

The UE shall transition from 5GMM-CONNECTED mode with RRC inactive indication to 5GMM-IDLE mode over 3GPP access upon receiving from the lower layers:

a) indication of transition from RRC_INACTIVE state to RRC_IDLE state;

b) AMF paging indication; or c) indication of cell selection to E-UTRAN or another RAT that the UE supports.

Regarding mobility and periodic registration update initiation, the UE in state 5GMM-REGISTERED shall initiate the registration procedure for mobility and periodic registration update by sending a REGISTRATION REQUEST message to the AMF, a) when the UE detects entering a tracking area that is not in the list of tracking areas that the UE previously registered in the AMF;

b) when the periodic registration updating timer T3512 expires;

c) when requested by the CONFIGURATION UPDATE COMMAND message;

d) when the UE in state 5GMM-REGISTERED.ATTEMPTING-REGISTRATION-UPDATE either receives a paging or the UE receives a NOTIFICATION message with access type indicating 3GPP access over the non-3GPP access for PDU sessions associated with 3GPP access;

e) upon inter-system change from S1 mode to N1 mode;

f) when the UE receives an indication that the transition from RRC_INACTIVE state to RRC_CONNECTED state has failed from the lower layers;

g) when the UE changes the 5GMM capability, or the S1 UE network capability, or both;

h) when the UE's usage setting changes;

i) when the UE needs to change the slice(s) it is currently registered to;

j) when the UE changes the UE specific DRX parameters;

k) when the UE in state 5GMM-REGISTERED.ATTEMPTING-REGISTRATION-UPDATE receives a request from the upper layers to establish an emergency PDU session or perform emergency services fallback;

l) when the UE needs to register for SMS over NAS, indicate a change in the requirements to use SMS over NAS, or de-register from SMS over NAS;

m) when the UE needs to indicate PDU session status to the network after local release of PDU session(s);

n) when the UE in 5GMM-IDLE mode changes the radio capability for NG-RAN;

o) when the UE receives a fallback indication without resume request from NAS from the lower layers;

p) when the UE receives a fallback indication from the lower layers and has a pending registration procedure for mobility and periodic registration update.

If item b) is the only reason for initiating the registration procedure for mobility and periodic registration update, the UE shall indicate "periodic registration updating" in the 5GS registration type IE; otherwise the UE shall indicate "mobility registration updating".

If the UE indicates "mobility registration updating" in the 5GS registration type IE and the UE supports S1 mode, the UE shall:

set the S1 mode bit to "S1 mode supported" in the 5GMM capability IE of the REGISTRATION REQUEST message, include the S1 UE network capability IE in the REGISTRATION REQUEST message; and if the UE supports sending an ATTACH REQUEST message containing a PDN CONNECTIVITY REQUEST message with request type set to "handover" to transfer a PDU session from N1 mode to S1 mode, set the HO attach bit to "attach request message containing PDN connectivity request with request type set to handover to transfer PDU session from N1 mode to S1 mode supported" in the 5GMM capability IE of the REGISTRATION REQUEST message.

If the UE operating in the single-registration mode performs inter-system change from S1 mode to N1 mode and has one or more stored UE policy sections, the UE shall include the UPSI LIST TRANSPORT message in the Payload container IE of the REGISTRATION REQUEST message.

The UE in state 5GMM-REGISTERED shall initiate the registration procedure for mobility and periodic update by sending a REGISTRATION REQUEST message to the AMF when the UE needs to request the use of SMS over NAS transport or the current requirements to use SMS over NAS transport change in the UE. The UE shall set the SMS requested bit of the 5GS registration type IE in the REGISTRATION REQUEST message.

When initiating a registration procedure for mobility and periodic registration update and the requirements to use SMS over NAS have not changed in the UE, the UE shall set the SMS requested bit of the 5GS registration type IE in the REGISTRATION REQUEST message to the same value as indicated by the UE in the last REGISTRATION REQUEST message.

If the UE no longer requires the use of SMS over NAS, then the UE shall set the SMS requested bit of the 5GS registration type IE to "SMS over NAS not supported" in the REGISTRATION REQUEST message.

After sending the REGISTRATION REQUEST message to the AMF the UE shall start timer T3510. If timer T3502 is currently running, the UE shall stop timer T3502. If timer T3511 is currently running, the UE shall stop timer T3511.

If the last visited registered TAI is available, the UE shall include the last visited registered TAI in the REGISTRATION REQUEST message.

The UE shall handle the 5GS mobility identity IE in the REGISTRATION REQUEST message as follows:

a) if the UE is operating in the single-registration mode, performs inter-system change from S1 mode to N1 mode, and the UE holds a valid 4G-GUTI, the UE shall include the 5G-GUTI mapped from the 4G-GUTI in the 5GS mobility identity IE. Additionally, if the UE holds a valid 5G-GUTI, the UE shall include the 5G-GUTI in the Additional GUTI IE in the REGISTRATION REQUEST message; and b) for all other cases, if the UE holds a valid 5G-GUTI, the UE shall indicate the 5G-GUTI in the 5GS mobile identity IE.

If the UE supports MICO mode and requests the use of MICO mode, then the UE shall include the MICO indication IE in the REGISTRATION REQUEST message.

If the UE wants to change the UE specific DRX parameters, the UE shall include the Requested DRX parameters IE in the REGISTRATION REQUEST message.

If the UE wants LADN information for either specific LADN DNN(s) or indicate a request for LADN information, the UE shall include the LADN indication IE in the REGISTRATION REQUEST message and:

- request specific LADN DNNs by including a LADN DNN value in the LADN indication IE for each LADN DNN for which the UE requests LADN information, or
- to indicate a request for LADN information by not including any LADN DNN value in the LADN indication IE.

If the UE is initiating the registration procedure for mobility and periodic registration update, the UE may include the Uplink data status IE to indicate which PDU session(s) have pending user data to be sent. If the UE has one or more active always-on PDU sessions and the user-plane resources for these PDU sessions are not established, the UE shall include the Uplink data status IE and indicate that the UE has pending user data to be sent for those PDU sessions. If the UE is located outside the LADN service area, the UE shall not include the PDU session for LADN in the Uplink data status IE.

If the UE has one or more active PDU sessions which are not accepted by the network as always-on PDU sessions and no uplink user data pending to be sent for those PDU sessions, the UE shall not include those PDU sessions in the Uplink data status IE in the REGISTRATION REQUEST message.

When the registration procedure for mobility and periodic registration update is initiated in 5GMM-IDLE mode, the UE may include a PDU session status IE in the REGISTRATION REQUEST message, indicating which PDU sessions associated with the access type the REGISTRATION REQUEST message is sent over are active in the UE.

If the UE received a paging message with the access type indicating non-3GPP access, the UE shall include the Allowed PDU session status IE in the REGISTRATION REQUEST message indicating the PDU session(s) for which the UE allows to re-establish the user-plane resources over 3GPP access.

If the UE operating in the single-registration mode performs inter-system change from S1 mode to N1 mode, the UE:

a) shall include the UE status IE with the EMM registration status set to "UE is in EMM-REGISTERED state" in the REGISTRATION REQUEST message;

In some embodiment, inclusion of the UE status IE with this setting corresponds to the indication that the UE is "moving from EPC".

b) may include the PDU session status IE in the REGISTRATION REQUEST message indicating the status of the PDU session(s) mapped during the inter-system change from S1 mode to N1 mode from the PDN connection(s) for which the EPS indicated that inter-working to 5GS is supported, if any; and c) shall include a TRACKING AREA UPDATE REQUEST message in the EPS NAS message container IE in the REGISTRATION REQUEST message.

If the UE operating in the single-registration mode performs inter-system change from S1 mode to N1 mode and the UE has at least one PDN connection with active EPS bearer context(s), the UE shall include in the Requested NSSAI IE of the REGISTRATION REQUEST message:

a) the S-NSSAI(s) which:
1) are associated with the established PDN connection(s); and
2) are applicable in the serving PLMN; and b) the mapping of these S-NSSAI(s) to the S-NSSAI(s) of the configured NSSAI for the HPLMN if the mapping information is available at the UE.

The UE shall include the requested NSSAI containing the S-NSSAI(s) corresponding to the slices to which the UE wants to register and shall include the mapping of requested NSSAI which is the mapping of each S-NSSAI of the requested NSSAI to the S-NSSAI(s) of the configured NSSAI for the HPLMN, if available, in the REGISTRATION REQUEST message. If the UE has allowed NSSAI or configured NSSAI for the current PLMN, the requested NSSAI shall be either:

a) the configured NSSAI for the current PLMN, or a subset thereof as described below, if the UE has no allowed NSSAI for the current PLMN;

b) the allowed NSSAI for the current PLMN, or a subset thereof as described below, if the UE has an allowed NSSAI for the current PLMN; or c) the allowed NSSAI for the current PLMN, or a subset thereof as described below, plus one or more S-NSSAIs from the configured NSSAI for which no corresponding S-NSSAI is present in the allowed NSSAI and those are neither in the rejected NSSAI for the current PLMN nor in the rejected NSSAI for the current PLMN and registration area combination.

If the UE has neither allowed NSSAI for the current PLMN nor configured NSSAI for the current PLMN and has a configured NSSAI not associated with a PLMN, the UE shall include the S-NSSAI(s) in the Requested NSSAI IE of the REGISTRATION REQUEST message using the configured NSSAI not associated with a PLMN. If the UE has no allowed NSSAI for the current PLMN, no configured NSSAI for the current PLMN, and no configured NSSAI not associated with a PLMN, the UE shall not include a requested NSSAI in the REGISTRATION REQUEST message.

The subset of configured NSSAI provided in the requested NSSAI consists of one or more S-NSSAIs in the configured NSSAI applicable to this PLMN, if the S-NSSAI is neither in the rejected NSSAIs for the current PLMN nor in the rejected NSSAI for the current PLMN and registration area combination.

The subset of allowed NSSAI provided in the requested NSSAI consists of one or more S-NSSAIs in the allowed NSSAI for this PLMN, if the rejected S-NSSAI(s) is added by the configuration update procedure and the S-NSSAI is neither in the rejected NSSAI for the current PLMN nor in the rejected NSSAI for the current PLMN and registration area combination.

In some embodiments, how the UE selects the subset of configured NSSAI or allowed NSSAI to be provided in the requested NSSAI is implementation.

In some embodiments, the number of S-NSSAI(s) included in the requested NSSAI cannot exceed eight.

The UE shall set the "follow-on request pending" indication to 1, if the UE:

a) initiates the mobility and periodic registration updating procedure upon request of the upper layers to establish an emergency PDU session;
b) initiates the mobility and periodic registration updating procedure upon receiving a request from the upper layers to send NAS signalling associated with emergency services fallback; or
c) needs to prolong the established NAS signalling connection after the completion of the registration procedure for mobility and periodic registration update (e.g., due to uplink signalling pending but no user data pending).

For case n), the UE shall set the NG-RAN-RCU bit of the 5GS registration type IE to "NG-RAN radio capability update needed" in the REGISTRATION REQUEST message.

For case p), the UE shall include the UL data status IE in the REGISTRATION REQUEST message indicating the PDU session(s) for which user-plane resources were active prior to receiving a fallback indication from the lower layers, if any, and PDU session(s) for which user-plane resources were not active prior to receiving a fallback indication from the lower layers and the UE has pending user data to be sent over 3GPP access, if any.

In some embodiments, the purpose of a service request procedure is to change the 5GMM mode from 5GMM-IDLE to 5GMM-CONNECTED mode, and/or to request the establishment of user-plane resources for PDU sessions which are established without user-plane resources. In latter case, the 5GMM mode can be the 5GMM-IDLE mode or the 5GMM-CONNECTED mode if the UE requires to establish user-plane resources for PDU sessions. This procedure is used when:
the network has downlink signalling pending over 3GPP access and the UE is in 5GMM-IDLE mode over 3GPP access,
the network has downlink signalling pending over non-3GPP access, the UE is in 5GMM-IDLE mode over non-3GPP access and in 5GMM-IDLE or 5GMM-CONNECTED mode over 3GPP access;
the UE has uplink signalling pending over 3GPP access and the UE is in 5GMM-IDLE mode over 3GPP access;
the network has downlink user data pending over 3GPP access and the UE is in 5GMM-IDLE mode over 3GPP access;
the network has downlink user data pending over non-3GPP access, the UE is in 5GMM-IDLE mode over non-3GPP access and in 5GMM-IDLE or 5GMM-CONNECTED mode over 3GPP access,
the UE has user data pending over 3GPP access and the UE is in 5GMM-IDLE or 5GMM-CONNECTED mode over 3GPP access;
the UE has user data pending over non-3GPP access and the UE is in 5GMM-CONNECTED mode over non-3GPP access;
the UE in 5GMM-IDLE mode over non-3GPP access, receives an indication from the lower layers of non-3GPP access, that the access stratum connection is established between UE and network; or
the UE in 5GMM-IDLE or 5GMM-CONNECTED mode over 3GPP access receives a request for emergency services fallback from the upper layer and performs emergency services fallback.

This procedure shall not be used for initiating user data transfer or PDU session management related signalling other than for performing UE-requested PDU session release procedure related to a PDU session for LADN when the UE is located outside the LADN service area.

In some embodiments, the service request procedure is initiated by the UE, while in other embodiments, it can be triggered by the network by means of:
the paging procedure for the transfer of downlink signalling or user data pending over 3GPP access to a UE in 5GMM-IDLE mode over 3GPP access;
the paging procedure for the transfer of downlink signalling or user data pending over non-3GPP access to a UE in 5GMM-IDLE mode over 3GPP access and in 5GMM-IDLE mode over non-3GPP access;
the notification procedure for the transfer of downlink signalling or user data pending over non-3GPP access to a UE in 5GMM-CONNECTED mode over 3GPP access and in 5GMM-IDLE mode over non-3GPP access; or
the notification procedure for the transfer of downlink signalling or user data pending over 3GPP access to a UE in 5GMM-IDLE mode over 3GPP access and in 5GMM-CONNECTED mode over non-3GPP access.

In some embodiments, in case the UE is in 5GMM-IDLE mode over 3GPP access and in 5GMM-CONNECTED mode over non-3GPP access and downlink signalling or user data pending over 3GPP access needs to be transferred, the AMF can trigger either the notification procedure or the paging procedure based on implementation.

The UE shall invoke the service request procedure when:
a) the UE in 5GMM-IDLE mode over 3GPP access, receives a paging request from the network;
b) the UE in 5GMM-CONNECTED mode over 3GPP access, receives a notification from the network with access type indicating non-3GPP access;
c) the UE in 5GMM-IDLE mode over 3GPP access, has uplink signalling pending;
d) the UE in 5GMM-IDLE mode over 3GPP access, has uplink user data pending;
e) the UE in 5GMM-CONNECTED mode, has user data pending due to no user-plane resources established for PDU session(s) used for user data transport;
f) the UE in 5GMM-IDLE mode over non-3GPP access, receives an indication from the lower layers of non-3GPP access, that the access stratum connection is established between UE and network;
g) the UE in 5GMM-IDLE mode over 3GPP access, receives a notification from the network with access type indicating 3GPP access when the UE is in 5GMM-CONNECTED mode over non-3GPP access;
h) the UE in 5GMM-IDLE or 5GMM-CONNECTED mode over 3GPP access receives a request for emergency services fallback from the upper layer and performs emergency services fallback;
i) the UE in 5GMM-CONNECTED mode over 3GPP access or in 5GMM-CONNECTED mode with RRC inactive indication receives a fallback indication from the lower layers, and the UE has pending uplink user data and no pending NAS procedure;
j) the UE in 5GMM-CONNECTED mode over 3GPP access or in 5GMM-CONNECTED mode with RRC inactive indication receives a fallback indication from the lower layers, and the UE has a pending service request procedure invoked due to reason other than case h) in this list;
k) the UE in 5GMM-CONNECTED mode over 3GPP access or in 5GMM-CONNECTED mode with RRC inactive indication receives a fallback indication from the lower layers, and the UE has a pending service request procedure invoked due to case h) in this list; or l) the UE in 5GMM-CONNECTED mode over 3GPP access or in 5GMM-CONNECTED mode with RRC inactive indication receives a fallback indication from the lower layers and the UE has a pending NAS procedure other than a registration, service request, or de-registration procedure.

If one of the above criteria to invoke the service request procedure is fulfilled, then the service request procedure shall only be initiated by the UE when the following conditions are fulfilled:

its 5GS update status is 5U1 UPDATED, and the TAI of the current serving cell is included in the TAI list; and no 5GMM specific procedure is ongoing.

The UE shall not invoke the service request procedure when the UE is in the state 5GMM-SERVICE-REQUEST-INITIATED.

A service request attempt counter is used to limit the number of service request attempts and no response from the network. The service request attempt counter shall be incremented.

The service request attempt counter shall be reset when:
a registration procedure is successfully completed;
a service request procedure is successfully completed; or
a service request procedure is rejected.

In some embodiments, the UE initiates the service request procedure by sending a SERVICE REQUEST message to the AMF and starts timer T3517.

For cases a), b), and g), the service type IE in the SERVICE REQUEST message shall be set to "mobile terminated services".

For cases c), d), e), f), i), and l), if the UE is a UE configured for high priority access in selected PLMN, the service type IE in the SERVICE REQUEST message shall be set to "high priority access".

For cases h) and k), the UE shall send a SERVICE REQUEST message with service type set to "emergency services fallback".

For case a):
a) if the paging request includes an indication for non-3GPP access type, the Allowed PDU session status IE shall be included in the SERVICE REQUEST message. If the UE has established the PDU session(s) associated with the S-NSSAI(s) which are included in the allowed NSSAI for 3GPP access, the UE shall indicate the PDU session(s) for which the UE allows the user-plane resources to be re-established over 3GPP access in the Allowed PDU session status IE. Otherwise, the UE shall not indicate any PDU session(s) in the Allowed PDU session status IE;
b) if the UE has uplink user data pending to be sent over 3GPP access, the Uplink data status IE shall be included in the SERVICE REQUEST message to indicate the PDU session(s) for which the UE has pending user data to be sent; or
c) otherwise, the Uplink data status IE shall not be included in the SERVICE REQUEST message.

For case b):
a) the Allowed PDU session status IE shall be included in the SERVICE REQUEST message. If the UE has the PDU session(s) associated with the S-NSSAI(s) which are included in the allowed NSSAI for 3GPP access, the UE shall indicate the PDU session(s) for which the UE allows the user-plane resources to be re-established over 3GPP access in the Allowed PDU session status IE. Otherwise, the UE shall not indicate any PDU session(s) in the Allowed PDU session status IE;
b) if the UE has uplink user data pending to be sent over 3GPP access, the Uplink data status IE shall be included in the SERVICE REQUEST message to indicate the PDU session(s) for which the UE has pending user data to be sent;
c) otherwise, the Uplink data status IE shall not be included in the SERVICE REQUEST message.

For case c), the Uplink data status IE shall not be included in the SERVICE REQUEST message except if the UE has one or more active always-on PDU sessions. The UE shall set the service type IE in the SERVICE REQUEST message to "emergency services", if the SERVICE REQUEST message is triggered by a request for emergency services from the upper layer and both the UE and the network support emergency services in N1 mode. Otherwise, if the UE is not a UE configured for high priority access in selected PLMN, the UE shall set the service type IE to "signalling".

For cases d) and e), the Uplink data status IE shall be included in the SERVICE REQUEST message to indicate the PDU session(s) the UE has pending user data to be sent. If the UE is not a UE configured for high priority access in selected PLMN, the service type IE in the SERVICE REQUEST message shall be set to "data".

For case f):
a) if the UE has uplink user data pending to be sent, the Uplink data status IE shall be included in the SERVICE REQUEST message to indicate the PDU session(s) the UE has pending user data to be sent. If the UE is not a UE configured for high priority access in selected PLMN, the service type IE in the SERVICE REQUEST message shall be set to "data";
b) otherwise, if the UE is not a UE configured for high priority access in selected PLMN, the service type IE in the SERVICE REQUEST message shall be set to "signalling".

For case g), if the UE has uplink user data pending to be sent, the Uplink data status IE shall be included in the SERVICE REQUEST message to indicate the PDU session(s) the UE has pending user data to be sent.

For case i), the UE shall include the Uplink data status IE in the SERVICE REQUEST message to indicate the PDU session(s) for which user-plane resources were active prior to receiving the fallback indication. If the UE is not a UE configured for high priority access in selected PLMN and:
a) if there is an emergency PDU session which is indicated in the Uplink data status IE, the UE shall set the Service type IE in the SERVICE REQUEST message to "emergency services"; or
b) if there is no emergency PDU session which is indicated in the Uplink data status IE, the UE shall set the Service type IE in the SERVICE REQUEST message to "data".

For case j), the UE shall:
a) include the Uplink data status IE in the SERVICE REQUEST message to indicate.
1) the PDU session(s) for which user-plane resources were active prior to receiving the fallback indication, if any; and
2) the PDU session(s) for which user-plane resources were not active prior to receiving the fallback indication and the UE has pending user data to be sent over 3GPP access, if any;
b) set the Service type IE in the SERVICE REQUEST message as follows:

1) if the UE invoked the pending service request procedure due to case b), the UE shall set the Service type IE in the SERVICE REQUEST message to "mobile terminated services"; or
2) if the UE invoked the pending service request procedure due to case e) and:
i) if the UE is a UE configured for high priority access in selected PLMN, the UE shall set the Service type IE in the SERVICE REQUEST message to "high priority access"; or
ii) if the UE is not a UE configured for high priority access in selected PLMN and:
A) if there exists an emergency PDU session which is indicated in the Uplink data status IE, the UE shall set the Service type IE in the SERVICE REQUEST message to "emergency services"; or
B) if there exists no emergency PDU session which is indicated in the Uplink data status IE, the UE shall set the Service type IE in the SERVICE REQUEST message to "data", and
C) include the Allowed PDU session status IE in the SERVICE REQUEST message if the UE invoked the pending service request procedure due to case b). If the UE has one or more PDU sessions over non-3GPP access associated with an S-NSSAI included in the allowed NSSAI for 3GPP access and the UE allows the user-plane resources for the PDU sessions over non-3GPP access to be re-established over 3GPP access, the UE shall indicate the PDU sessions in the Allowed PDU session status IE. Otherwise, the UE shall indicate no PDU session in the Allowed PDU session status IE.

For case l):
a) the UE shall handle inclusion of the Uplink data status IE in the SERVICE REQUEST message as follows:
1) if the UE in 5GMM-CONNECTED mode over 3GPP access invokes the service request procedure, the UE shall include the Uplink data status IE in the SERVICE REQUEST message to indicate the PDU sessions for which user-plane resources were active prior to receiving the fallback indication, if any; or
2) if the UE in 5GMM-CONNECTED mode with RRC inactive indication invokes the service request procedure, the UE shall not include the Uplink data status IE in the SERVICE REQUEST message except if the UE has one or more active always-on PDU sessions; and
b) the UE not configured for high priority access in selected PLMN, shall set the Service type IE in the SERVICE REQUEST message as follows:
1) if the pending message is an UL NAS TRANSPORT message with the Request type IE set to "initial emergency request" or "existing emergency PDU session", the UE shall set the Service type IE in the SERVICE REQUEST message to "emergency services"; or
2) if the pending message is not an UL NAS TRANSPORT message with the Request type IE set to "initial emergency request" or "existing emergency PDU session", the UE shall set the Service type IE in the SERVICE REQUEST message to "signalling".

The UE shall include a valid 5G-S-TMSI in the 5G-S-TMSI IE of the SERVICE REQUEST message.

If the UE has one or more active always-on PDU sessions and the user-plane resources for these PDU sessions are not established, the UE shall include the Uplink data status IE in the SERVICE REQUEST message and indicate that the UE has pending user data to be sent for those PDU sessions.

If the UE has one or more active PDU sessions which are not accepted by the network as always-on PDU sessions and no uplink user data pending to be sent for those PDU sessions, the UE shall not include those PDU sessions in the Uplink data status IE in the SERVICE REQUEST message.

The PDU session status information element may be included in the SERVICE REQUEST message to indicate the PDU session(s) available in the UE associated with the access type the SERVICE REQUEST message is sent over. If the PDU session status information element is included in the SERVICE REQUEST message, then the AMF shall release all those PDU sessions locally (without peer-to-peer signalling between the UE and the network) which are in active on the AMF side associated with the access type the SERVICE REQUEST message is sent over, but are indicated by the UE as being inactive, and shall request the SMF to release all those PDU sessions locally.

In some embodiments, with regard to service request procedures accepted by the network, for cases other than h) or k), the UE shall treat the reception of the SERVICE ACCEPT message as successful completion of the procedure. The UE shall reset the service request attempt counter, stop timer T3517 and enter the state 5GMM-REGISTERED.

For cases h) and k), the UE shall treat the indication from the lower layers when the UE has changed to S1 mode or E-UTRA connected to 5GCN as successful completion of the procedure and stop timer T3517.

If the AMF needs to initiate PDU session status synchronization or a PDU session status IE was included in the SERVICE REQUEST message, the AMF shall include a PDU session status IE in the SERVICE ACCEPT message to indicate which PDU sessions associated with the access type the SERVICE ACCEPT message is sent over are active in the AMF. If the PDU session status information element is included in the SERVICE ACCEPT message, then the UE shall release all those PDU sessions locally (without peer-to-peer signalling between the network and the UE) which are in active on the UE side associated with the access type the SERVICE ACCEPT message is sent over but are indicated by the AMF as being inactive.

If the Uplink data status IE is included in the SERVICE REQUEST message, the AMF shall:
A) indicate the SMF to re-establish the user-plane resources for the corresponding PDU sessions;
B) include the PDU session reactivation result IE in the SERVICE ACCEPT message to indicate the user-plane resources reactivation result of the PDU sessions the UE requested to re-establish;
C) determine the UE presence in LADN service area and forward the UE presence in LADN service area towards the SMF, if the corresponding PDU session is a PDU session for LADN; and
D) include a cause #43 "LADN not available" to indicate the user-plane resources of the PDU session are not established in the PDU session reactivation result error cause IE of the SERVICE ACCEPT message, if the corresponding PDU session is a PDU session for LADN and the SMF indicated to the AMF that the UE is located outside the LADN service area.

If the Allowed PDU session status IE is included in the SERVICE REQUEST message, the AMF shall:
A) indicate the SMF to re-establish the user-plane resources for the corresponding PDU sessions allowed to be re-established over 3GPP access and have indicated pending downlink data if there is at least one PDU session that indicated in the Allowed PDU session status IE can be re-established over 3GPP access;
B) notify the SMF that have indicated pending downlink data, that reactivation of the user-plane resources for the corresponding PDU sessions cannot be performed if not allowed to be re-established over 3GPP access; and C) include the PDU session reactivation result IE in the SERVICE ACCEPT message to indicate the successfully re-established user-plane resources for the corresponding PDU sessions, if any.

If the AMF has included the PDU session reactivation result IE in the SERVICE ACCEPT message and there exist one or more PDU sessions for which the user-plane resources cannot be re-established, then the AMF may include the PDU session reactivation result error cause IE to indicate the cause of failure to re-establish the user-plane resources.

If the user-plane resources cannot be established for a PDU session due to resource unavailability in the UPF, the AMF shall include the PDU session reactivation result IE in the SERVICE ACCEPT message indicating that user-plane resources for the corresponding PDU session cannot be re-established, and shall include the PDU session reactivation result error cause IE with the 5GMM cause set to #92 "insufficient user-plane resources for the PDU session".

In some embodiments, it is up to UE implementation when to re-send a request for user-plane re-establishment for the associated PDU session after receiving a PDU session reactivation result error cause IE with a 5GMM cause set to #92 "insufficient user-plane resources for the PDU session".

If the SERVICE REQUEST message is for emergency services fallback, the AMF triggers the emergency services fallback procedure.

Figure 15:
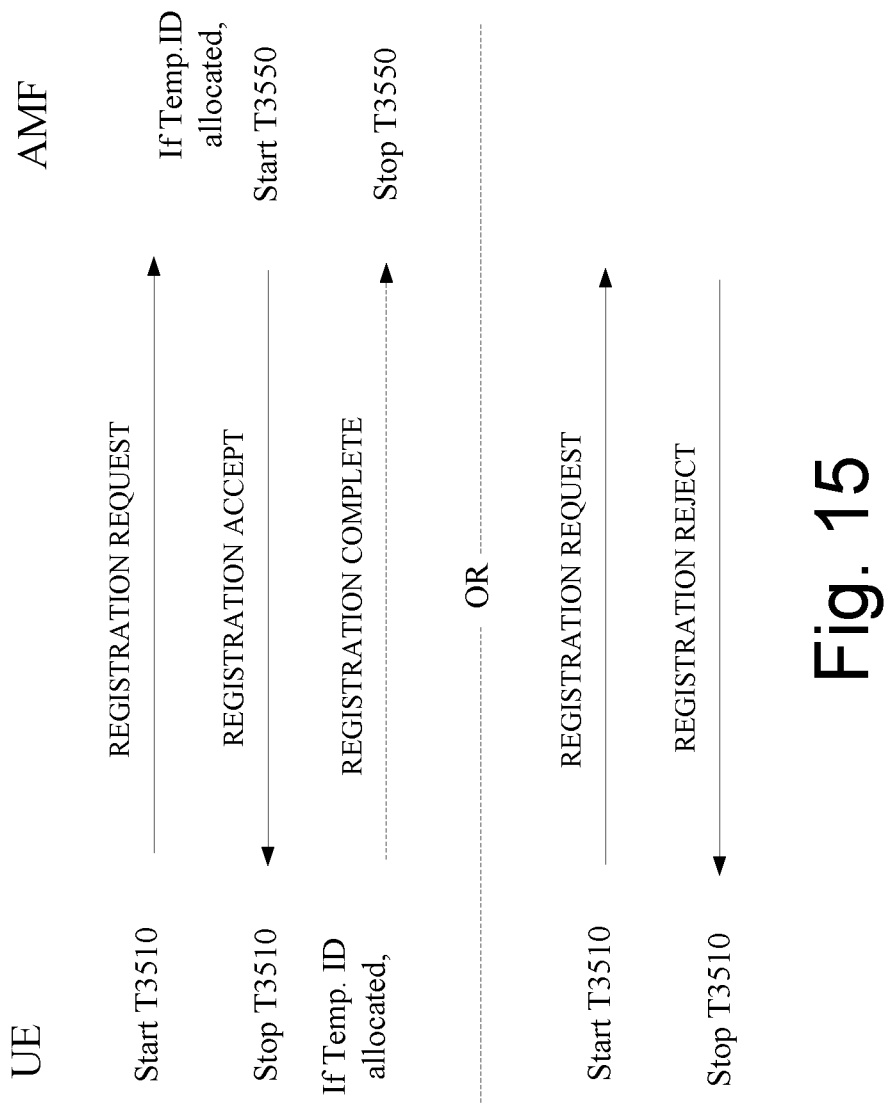
FIG. 15 shows a schematic representation of a diagram of a method of performing a registration request procedure in accordance with proposed modifications to 3GPP TS24.501.

FIG. 15 shows a schematic representation of a diagram of a method of performing a registration request procedure that may be incorporated into the procedure described in 3GPP TS 24.501 (e.g., in section 5.5.1.3.2).

Figure 16:
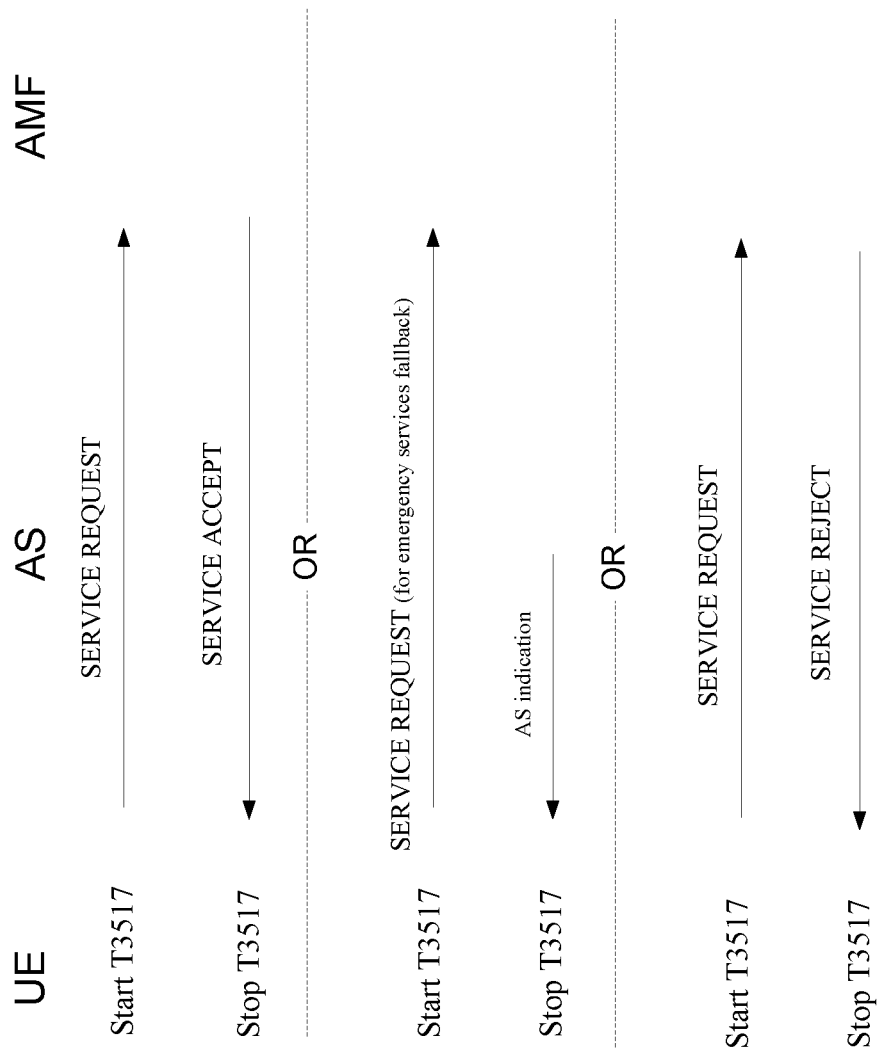
FIG. 16 shows a schematic representation of a diagram of a method of performing a service request procedure in accordance with proposed modifications to 3GPP TS24.501.

FIG. 16 shows a schematic representation of a diagram of a method of performing a service request procedure that may be incorporated into the procedure described in 3GPP TS 24.501 (e.g., in section 5.6.1.1).

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic, or any combination thereof. For example, some aspects may be implemented in hardware, while other aspects may be implemented in firmware or software which may be executed by a controller, microprocessor, or other computing device, although embodiments are not limited thereto. While various embodiments may be illustrated and described as block diagrams, flow charts, or using some other pictorial representation, it is well understood that these blocks, apparatus, systems, techniques, or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 6 to 13, may represent program steps, or interconnected logic circuits, blocks and functions, or a combination of program steps and logic circuits, blocks, and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
(i) a combination of analogue and/or digital hardware circuit(s) with software/firmware and
(ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
at least one processor; and
at least one memory storing instructions thereon that, when executed by the at least one processor, cause the apparatus to perform at least:
in response to receiving a fallback indication from a radio resource control layer, when the apparatus has no pending non-access stratum procedure and has pending uplink user data:

invoking a service request procedure;
setting an uplink data status information element (IE) in a service request message to indicate one or more packet data unit (PDU) sessions for which user-plane resources were active prior to receiving the fallback indication; and
setting a service type information element in the service request message to "emergency services" if the uplink data status IE indicates an emergency PDU session, or to "data" if the uplink data status IE indicates no emergency PDU session.

2. The apparatus of claim 1, wherein the instructions stored on the at least one memory, when executed by the at least one processor, further cause the apparatus to perform at least:
determining that the apparatus has pending uplink user data and has no pending non-access stratum procedure.

3. The apparatus of claim 1, wherein the apparatus is in a connected mode.

4. The apparatus of claim 1, wherein the apparatus is in a connected inactive mode.

5. The apparatus of claim 1, wherein at least one of the receiving, the determining, the invoking or the setting is performed at a non-access stratum layer.

6. A method performed by an apparatus, the method comprising:
in response to receiving a fallback indication from a radio resource control layer, when the apparatus has no pending non-access stratum procedure and has pending uplink user data:
invoking a service request procedure;
setting an uplink data status information element (IE) in a service request message to indicate one or more packet data unit (PDU) sessions for which user-plane resources were active prior to receiving the fallback indication; and
setting a service type information element in the service request message to "emergency services" if the uplink data status IE indicates an emergency PDU session, or to "data" if the uplink data status IE indicates no emergency PDU session.

7. The method of claim 6, further comprising:
determining that the apparatus has pending uplink user data and has no pending non-access stratum procedure.

8. The method of claim 6, wherein the apparatus is in a connected mode or in a connected inactive mode.

9. A computer program product with a non-transitory computer readable medium comprising computer executable instructions which, when run on one or more processors, perform at least:
in response to receiving a fallback indication from a radio resource control layer, when an apparatus has no pending non-access stratum procedure and has pending uplink user data:
invoking a service request procedure;
setting an uplink data status information element (IE) in a service request message to indicate one or more packet data unit (PDU) sessions for which user-plane resources were active prior to receiving the fallback indication; and
setting a service type information element in the service request message to "emergency services" if the uplink data status IE indicates an emergency PDU session, or to "data" if the uplink data status IE indicates no emergency PDU session.

10. The apparatus of claim 1, wherein the instructions stored on the at least one memory, when executed by the at least one processor, further cause the apparatus to perform at least:
in response to receiving the fallback indication,
when the apparatus has a pending non-access stratum procedure other than a registration procedure, a service request procedure, or a de-registration procedure:
invoking the service request procedure; and
setting a service type IE in the service request message to "emergency services" if a message for the pending non-access stratum procedure is an uplink non-access stratum transport message including a request type IE set to "initial emergency request" or "existing emergency PDU session", or to "signalling" otherwise.

11. The apparatus of claim 10, wherein the instructions stored on the at least one memory, when executed by the at least one processor, further cause the apparatus to perform at least:
setting the uplink data status IE in the service request message to indicate one or more PDU sessions for which user-plane resources were active prior to receiving the fallback indication, when the apparatus in connected mode has the pending non-access stratum procedure other than the service request procedure.

12. The apparatus of claim 10, wherein the instructions stored on the at least one memory, when executed by the at least one processor, further cause the apparatus to perform at least:
setting the uplink data status IE in the service request message to indicate one or more always-on PDU sessions, when the apparatus in connected inactive mode has the pending non-access stratum procedure other than the service request procedure.

13. The apparatus of claim 10, wherein the instructions stored on the at least one memory, when executed by the at least one processor, further cause the apparatus to perform at least:
determining that the apparatus has the pending non-access stratum procedure other than the registration procedure, the service request procedure or the deregistration procedure.

14. The apparatus of claim 1, wherein the instructions stored on the at least one memory, when executed by the at least one processor, further cause the apparatus to perform at least:
in response to receiving the fallback indication,
when the apparatus has a pending service request procedure invoked due to other than an emergency service fallback:
invoking the service request procedure; and
setting the service type IE in the service request message to "mobile terminated services", "high priority access", "emergency services" or "data" if the apparatus has the pending service request procedure due to other than an emergency service fallback.

15. The apparatus of claim 14, wherein the instructions stored on the at least one memory, when executed by the at least one processor, further cause the apparatus to perform at least:
setting the uplink data status IE in the service request message to indicate one or more PDU sessions for which user-plane resources were not active prior to receiving the fallback indication and the apparatus has pending user data to be sent over a cellular network when the apparatus has the pending service request procedure invoked due to other than the emergency service fallback.

16. The apparatus of claim 14, wherein the instructions stored on the at least one memory, when executed by the at least one processor, further cause the apparatus to perform at least:
determining that the apparatus has the pending service request procedure invoked due to other than the emergency service fallback.

17. The apparatus of claim 1, wherein the instructions stored on the at least one memory, when executed by the at least one processor, further cause the apparatus to perform at least:
in response to receiving the fallback indication,
when the apparatus has a pending service request procedure invoked due to an emergency service fallback:
invoking the service request procedure; and
setting the service type IE in the service request message to "emergency services fallback" if the apparatus has the pending service request procedure due to the emergency service fallback.

18. The apparatus of claim 1, wherein the apparatus comprises a user equipment.

19. The method of claim 6, further comprising:
in response to receiving the fallback indication,
when the apparatus has a pending non-access stratum procedure other than a registration procedure, a service request procedure, or a de-registration procedure:
invoking the service request procedure; and
setting a service type IE in the service request message to "emergency services" if a message for the pending non-access stratum procedure is an uplink non-access stratum transport message including a request type IE set to "initial emergency request" or "existing emergency PDU session", or to "signalling" otherwise.

20. The method of claim 19, further comprising:
setting the uplink data status IE in the service request message to indicate one or more PDU sessions for which user-plane resources were active prior to receiving the fallback indication, when the apparatus in connected mode has the pending non-access stratum procedure other than the service request procedure.

21. The method of claim 19, further comprising:
setting the uplink data status IE in the service request message to indicate one or more always-on PDU sessions, when the apparatus in connected inactive mode has the pending non-access stratum procedure other than the service request procedure.

22. The method of claim 19, further comprising:
determining that the apparatus has the pending non-access stratum procedure other than the registration procedure, the service request procedure or the deregistration procedure.

23. The method of claim 6, further comprising:
in response to receiving the fallback indication,
when the apparatus has a pending service request procedure invoked due to other than an emergency service fallback:
invoking the service request procedure; and
setting the service type IE in the service request message to "mobile terminated services", "high priority access", "emergency services" or "data" if the apparatus has the pending service request procedure due to other than an emergency service fallback.

24. The method of claim 23, further comprising:
setting the uplink data status IE in the service request message to indicate one or more PDU sessions for which user-plane resources were not active prior to receiving the fallback indication and the apparatus has pending user data to be sent over a cellular network when the apparatus has the pending service request procedure invoked due to other than the emergency service fallback.

25. The method of claim 23, further comprising:
determining that the apparatus has the pending service request procedure invoked due to other than the emergency service fallback.

26. The method of claim 23, further comprising:
in response to receiving the fallback indication,
when the apparatus has a pending service request procedure invoked due to an emergency service fallback:
invoking the service request procedure; and
setting the service type IE in the service request message to "emergency services fallback" if the apparatus has the pending service request procedure due to the emergency service fallback.

27. The method of claim 6, wherein the apparatus comprises a user equipment.

28. The method of claim 6, wherein at least one of; the receiving, the determining, the invoking, or the setting is performed at a non-access stratum layer.

29. The apparatus of claim 1, wherein said invoking the service request procedure is in response to receiving, over a third-generation partnership project (3GPP) access, a NOTIFICATION message with an access type information element (IE) indicating non-3GPP access.

30. The apparatus of claim 1, wherein said invoking the service request procedure is in response to the apparatus being in a connected mode or a connected inactive mode, and the apparatus having user data pending due to a non-user plane resource established for protocol data unit (PDU) sessions being used for data transport.

* * * * *

UNITED STATES PATENT AND TRADEMARK OFFICE
CERTIFICATE OF CORRECTION

PATENT NO. : 12,082,286 B2  
APPLICATION NO. : 17/291153  
DATED : September 3, 2024  
INVENTOR(S) : Sung Hwan Won Page 1 of 1

It is certified that error appears in the above-identified patent and that said Letters Patent is hereby corrected as shown below:

On the Title Page

In Column 2, item (57), Abstract, Line 1, delete "processor:" and insert -- processor; --, therefor.

In Column 2, item (57), Abstract, Line 2, delete "code:" and insert -- code; --, therefor.

In Column 2, item (57), Abstract, Line 6, delete "layer:" and insert -- layer; --, therefor.

In Column 2, item (57), Abstract, Line 6, delete "procedure:" and insert -- procedure; --, therefor.

In the drawing, reference numeral 702, Line 1, delete "that that" and insert -- that --, therefor.

In the Drawings

In sheet 7 of 16, FIG. 7, reference numeral 702, Line 1, delete "that that" and insert -- that --, therefor.

In sheet 8 of 16, FIG. 8, reference numeral 802, Line 1, delete "that that" and insert -- that --, therefor.

In the Claims

In Column 36, Line 41, Claim 28, delete "of;" and insert -- of: --, therefor.

Signed and Sealed this  
Twenty-first Day of January, 2025

Coke Morgan Stewart  
*Acting Director of the United States Patent and Trademark Office*